United States Patent
Kyusojin

(10) Patent No.: US 7,626,993 B2
(45) Date of Patent: Dec. 1, 2009

(54) TRANSMISSION DEVICE AND METHOD, RECORDING MEDIUM, PROGRAM, AND CONTROL DEVICE

(75) Inventor: Hiroshi Kyusojin, Tokyo (JP)

(73) Assignee: Sony Corporation (JP)

( * ) Notice: Subject to any disclaimer, the term of this patent is extended or adjusted under 35 U.S.C. 154(b) by 801 days.

(21) Appl. No.: 11/248,466

(22) Filed: Oct. 12, 2005

(65) Prior Publication Data

US 2006/0098584 A1     May 11, 2006

(30) Foreign Application Priority Data

Oct. 14, 2004    (JP)   ............................ P2004-300352

(51) Int. Cl.
H04L 12/28    (2006.01)

(52) U.S. Cl. ........................ 370/412; 370/401; 370/252

(58) Field of Classification Search ........................ None
See application file for complete search history.

(56) References Cited

U.S. PATENT DOCUMENTS

| | | | |
|---|---|---|---|
| 2001/0030967 A1 | 10/2001 | Kyusojin et al. | |
| 2002/0114277 A1 | 8/2002 | Kyusojin | |
| 2003/0174650 A1* | 9/2003 | Shankar et al. | 370/235 |
| 2004/0085977 A1* | 5/2004 | Gaur | 370/412 |
| 2005/0216822 A1 | 9/2005 | Kyusojin et al. | |

FOREIGN PATENT DOCUMENTS

JP      2001-211207      8/2001

OTHER PUBLICATIONS

J.S. Turner, "New Directions in Communications (or Which Way to the Information Age)," IEEE Communication Magazine, vol. 24, pp. 8-15, Oct. 1986).
Luca Abeni, Ashvin Goel, Charles Krasic, Jim Snow and Jonathan Walpole, "A Measurement-Based Analysis of the Real-Time Performance of Linux," IEEE RTAS Sep. 2, 2002, pp. 1-10.
Sally Floyd et al., "Random Early Detection Gateways for Congestion Avoidance," IEEE/ACM Transactions on Networking, vol. 1, No. 4, Aug., 1993, pp. 1-32.
Alan Cox proposes, in Simple Traffic Shaper disclosed in Red Hat (trademark) distribution of Linux (trademark), a method of controlling an amount of traffic, in which method a virtual output interface is considered and a corresponding virtual device driver (1996).

* cited by examiner

*Primary Examiner*—Duc C Ho
(74) *Attorney, Agent, or Firm*—Lerner, David, Littenberg, Krumholz & Mentlik, LLP

(57) ABSTRACT

A transmission device includes a determining unit operable to determine whether a number of packets stored in a buffer is equal to or smaller than a second threshold value smaller than a first threshold value when transmission of a selected packet is requested by a requesting unit; a storing controller operable to control storing of the selected packet in the buffer when the determining unit determines that the number of packets stored in the buffer is equal to or smaller than the second threshold value, and so as not to store the selected packet in the buffer when the determining unit determines that the number of packets stored in the buffer exceeds the second threshold value; and an output controller operable to control output of the selected packet stored in the buffer to a control program for controlling transmission of the selected packet by hardware based on a queue when the transmission of the selected packet is requested by the requesting unit.

9 Claims, 11 Drawing Sheets

TRANSMISSION DEVICE AND METHOD, RECORDING MEDIUM, PROGRAM, AND CONTROL DEVICE

CROSS-REFERENCE TO RELATED APPLICATIONS

The present application claims priority from Japanese Application No. 2004-300352 filed Oct. 14, 2004, the disclosure of which is hereby incorporated by reference herein.

BACKGROUND OF THE INVENTION

The present invention relates to a transmission device and a transmission method, a recording medium, a program, and a control device, and particularly to a transmission device and a transmission method, a recording medium, a program, and a control device for transmitting packets.

With the spread of the Internet, real-time application programs for videoconferencing, IP (Internet Protocol) telephones and the like have come into use. When these real-time application programs are used, a communication apparatus stores data such as video, audio and the like in packets, and transmits the packets storing the data to a terminal device on a receiving side via a network or the Internet.

FIG. 1 is a block diagram showing a configuration of functions implemented by a packet transmitting communication apparatus calling an application program and functions of a kernel of an operating system.

Data specified to be transmitted by a user in an application layer 11 is supplied from the application layer 11 to a network layer 12. In the network layer 12, the data supplied from the application layer 11 is stored in a packet. The packet storing the data is supplied to a device driver 14-1 or a device driver 14-2 determined by the destination (transmission destination) of the packet by referring to a routing table 13 in the network layer 12.

The routing table 13 includes information indicating an address of a terminal device (communication device) connected to a network and a route (gateway) to the terminal device on the network and the Internet. Hence, when the terminal device as the transmission destination of the packet is identified, the route to the terminal device is determined. Thereby an output interface for processing the packet to be transmitted is determined. The packet is thus supplied to the device driver 14-1 or the device driver 14-2 corresponding to the output interface.

The device driver 14-1 and the device driver 14-2 control a physical device (a physical layer 16-1 or a physical layer 16-2). The device driver 14-1 and the device driver 14-2 have a function of synchronizing processes between an OS (Operating System) and the physical device (the physical layer 16-1 or the physical layer 16-2).

An input processing unit 31-1 of the device driver 14-1 stores the packet supplied to the device driver 14-1 in a buffer 15, and disposes the packet in a FIFO (First In First Out) queue. When an interrupt signal indicating that packet transmission in the physical layer 16-1 is completed is supplied from the physical layer 16-1 to the device driver 14-1, an output processing unit 32-1 of the device driver 14-1 obtains the packet stored in the buffer 15 in order of arrangement in the FIFO queue, and supplies the packet to the physical layer 16-1.

In the physical layer 16-1, the packet supplied to the physical layer 16-1 is converted into an electric signal for communication, and the electric signal is transmitted to the terminal device as the transmission destination of the packet via the network or the Internet.

Similarly, an input processing unit 31-2 of the device driver 14-2 stores the packet supplied to the device driver 14-2 in the buffer 15, and disposes the packet in another FIFO queue. When an interrupt signal indicating that packet transmission in the physical layer 16-2 is completed is supplied from the physical layer 16-2 to the device driver 14-2, an output processing unit 32-2 of the device driver 14-2 obtains the packet stored in the buffer 15 in order of arrangement in the FIFO queue, and supplies the packet to the physical layer 16-2.

In the physical layer 16-2, the packet supplied to the physical layer 16-2 is converted into an electric signal for communication, and the electric signal is transmitted to the terminal device as the transmission destination of the packet via the network or the Internet.

This communication apparatus does not perform, for example, adjustment of transmission intervals of packets transmitted to a terminal device via the network or the Internet. Therefore, when the real-time application program supplies a packet from the application layer 11 to the network layer 12 by burst transfer, the physical layer 16-1 or the physical layer 16-2 transmits the packet to the terminal device as a transmission destination by burst transfer.

When the real-time application program is used, however, data (packet) transfer with little delay is required. The communication apparatus on a transmitting side therefore needs to avoid occurrence of so-called burst traffic, which results from burst transfer of data on the network or the Internet, by adjusting intervals at which packets are transmitted.

That is, as Sally Floyd describes, burst traffic is a factor in causing many undesirable situations such for example as global synchronization in which periods of detection of congestion in terminal devices, decrease in a band in use, and increase in the band in use are synchronous with each other, an unexpected packet loss, and increase in delay in data transfer between the terminal devices. In order to avoid such situations, the communication apparatus (terminal device) on a transmitting side needs traffic shaping technology, which controls an amount of traffic (see Sally Floyd and Van Jacobson, "Random Early Detection Gateways for Congestion Avoidance," IEEE/ACM Transactions on Networking Vol. 1 No. 4, August, 1993).

Accordingly, control of an amount of traffic in a device driver is proposed. However, since there are as many device drives as kinds of network cards or hardware (chips) used therein, to directly add a function of traffic shaping to the device drivers would require an enormous amount of work.

As a method for solving this problem, Alan Cox proposes, in Simple Traffic Shaper disclosed in Red Hat (trademark) distribution of Linux (trademark), a method of controlling an amount of traffic, in which method a virtual output interface is considered and a corresponding virtual device driver (hereinafter referred to as a virtual device driver) is provided.

FIG. 2 is a block diagram showing a functional configuration of a communication apparatus that controls an amount of traffic in a virtual device driver. Incidentally, in the figure, parts corresponding to those in FIG. 1 are identified by the same reference numerals, and description thereof will be omitted as appropriate.

In a network layer 51, data supplied from an application layer 11 is stored in a packet. A route on the Internet which route is determined by a destination (transmission destination) of the packet is set by referring to a routing table 52, and the packet is supplied to a virtual device driver 53.

Specifically, when the data (packet) supplied from the application layer 11 to the network layer 51 is transmitted via a device driver 56-1 or a device driver 56-2, a virtual output interface not shown in the figure is set as an output interface determined by the destination of the packet. The packet to be transmitted is supplied to the virtual device driver 53 corresponding to the virtual output interface.

An input processing unit 71 of the virtual device driver 53 stores the packet supplied to the virtual device driver 53 in a buffer 55, and disposes the packet in a FIFO queue. An output processing unit 72 of the virtual device driver 53 obtains the packet stored in the buffer 55 at a predetermined time interval, and supplies the packet to the device driver 56-1 or the device driver 56-2.

That is, each time an interrupt signal to obtain a packet is supplied from a kernel timer 54, the output processing unit 72 of the virtual device driver 53 obtains the packet from the buffer 55 at a predetermined time interval, and supplies the obtained packet to the device driver 56-1 or the device driver 56-2.

An input processing unit 73-1 of the device driver 56-1 stores the packet supplied to the device driver 56-1 in the buffer 55. When an interrupt signal indicating that packet transmission in a physical layer 16-1 is completed is supplied from the physical layer 16-1 to the device driver 56-1, an output processing unit 74-1 of the device driver 56-1 obtains the packet stored in the buffer 55, and supplies the packet to the physical layer 16-1.

Similarly, an input processing unit 73-2 of the device driver 56-2 stores the packet supplied to the device driver 56-2 in the buffer 55. When an interrupt signal indicating that packet transmission in a physical layer 16-2 is completed is supplied from the physical layer 16-2 to the device driver 56-2, an output processing unit 74-2 of the device driver 56-2 obtains the packet stored in the buffer 55, and supplies the packet to the physical layer 16-2.

A packet enqueueing process by the virtual device driver 53 will be described with reference to a flowchart of FIG. 3.

Each time a packet is supplied from the network layer 51 to the virtual device driver 53, the virtual device driver 53 calls a predetermined function, and performs a packet enqueueing process.

In step S11, the virtual device driver 53 sets a maximum queue length for packets to be stored in the buffer 55. For example, in step S11, the virtual device driver 53 sets "5" as the maximum queue length Qm for packets to be stored in the buffer 55. The maximum queue length Qm refers to a maximum number of packets that can be stored in the buffer 55. Hence, when "5" is set as the maximum queue length Qm, the buffer 55 can store up to five packets.

In step S12, the virtual device driver 53 sets the queue length of packets stored in the buffer 55. In this case, no packet is stored in the buffer 55, and therefore the virtual device driver 53 sets "0" as the packet queue length Q. The queue length Q refers to the number of packets stored in the buffer 55.

In step S13, the virtual device driver 53 sets a stored packet number. The stored packet number refers to the packet number of a last stored packet among packets stored in the buffer 55 by the virtual device driver 53. When a packet is supplied from the network layer 51 to the virtual device driver 53, the virtual device driver 53 attaches a packet number i for identifying each packet to the supplied packet. The packet number is attached in ascending order starting with "1." Incidentally, when the packet number i is "0," the packet number indicates that no packet is supplied to the virtual device driver 53 yet.

Thus, in this case, no packet is stored in the buffer 55, and therefore the virtual device driver 53 sets "0" as the stored packet number.

In step S14, the input processing unit 71 in the virtual device driver 53 obtains a packet from the network layer 51.

In step S15, the input processing unit 71 in the virtual device driver 53 determines whether the queue length Q is less than the maximum queue length Qm. In this case, the input processing unit 71 in the virtual device driver 53 determines whether the queue length Q is less than the maximum queue length Qm by calculating Equation (1) and determining whether the queue length Q and the maximum queue length Qm satisfy Equation (1).

$$Q < Qm \qquad (1)$$

Hence, when the queue length Q is "1" and the maximum queue length Qm is "5," for example, the queue length Q and the maximum queue length Qm satisfy Equation (1), and therefore it is determined that the queue length Q is less than the maximum queue length Qm.

When it is determined in step S15 that the queue length Q is not less than the maximum queue length Qm, the buffer 55 cannot store a packet any more. Thus, the process proceeds to step S16, where the input processing unit 71 in the virtual device driver 53 discards the packet obtained from the network layer 51. The process returns to step S14.

When it is determined in step S15 that the queue length Q is less than the maximum queue length Qm, on the other hand, the buffer 55 can store the packet. Thus, the process proceeds to step S17, where the input processing unit 71 in the virtual device driver 53 attaches a packet number i to the packet supplied from the network layer 51.

In step S18, the input processing unit 71 in the virtual device driver 53 performs a transmission time calculating process. While details of the transmission time calculating process will be described later, the input processing unit 71 in the virtual device driver 53 in the transmission time calculating process calculates the transmission time of the packet supplied from the network layer 51. The transmission time of the packet refers to a time at which the packet is transmitted to a terminal device as a transmission destination in the physical layer 16-1 or the physical layer 16-2.

In step S19, the input processing unit 71 in the virtual device driver 53 increments the stored packet number.

In step S20, the input processing unit 71 in the virtual device driver 53 enqueues the packet supplied from the network layer 51. Enqueueing refers to a process of disposing a packet in a FIFO queue (a queueing process). Specifically, in step S20, the input processing unit 71 in the virtual device driver 53 supplies the packet obtained from the network layer 51 to the buffer 55. The packet supplied from the virtual device driver 53 is stored in the buffer 55, and disposed in a FIFO queue.

In step S21, the input processing unit 71 in the virtual device driver 53 increments the queue length Q. The process then returns to step S14 to repeat the above-described process.

With reference to a flowchart of FIG. 4, description will be made of a transmission time calculating process corresponding to the process of step S18 in FIG. 3 when a Leaky Bucket algorithm (see J. S. Turner, "New Directions in Communications (or Which Way to the Information Age)," IEEE Communication Magazine Vol. 24 pp. 8-15, October, 1986) is used as a scheduling algorithm.

In step S41, the input processing unit 71 in the virtual device driver 53 determines whether the packet number i of the packet supplied from the network layer 51 is "0."

When the input processing unit 71 in the virtual device driver 53 determines in step S41 that the packet number i of the packet supplied from the network layer 51 is not "0," the process proceeds to step S42, where the input processing unit 71 in the virtual device driver 53 calculates the transmission time of the packet supplied from the network layer 51. In this case, the input processing unit 71 in the virtual device driver 53 calculates the transmission time of the packet by calculating Equation (2).

$$(Ti)=(T(i-1))+(L(i-1))/r \qquad (2)$$

where Ti is the transmission time of the packet having the packet number i; T(i−1) is the transmission time of a packet having a packet number "i−1"; L(i−1) is the size (amount of data) of the packet having the packet number "i−1"; and r is the predetermined transmission speed (hereinafter referred to as shaping rate) of packets transmitted by the communication apparatus.

In step S43, the input processing unit 71 in the virtual device driver 53 determines whether the queue length Q is "0." When the input processing unit 71 in the virtual device driver 53 determines in step S43 that the queue length Q is not "0," the process proceeds to step S45.

On the other hand, when the input processing unit 71 in the virtual device driver 53 determines in step S43 that the queue length Q is "0," the process proceeds to step S44, where the input processing unit 71 in the virtual device driver 53 determines whether the calculated transmission time Ti is later than a present time.

When the input processing unit 71 in the virtual device driver 53 determines in step S44 that the calculated transmission time Ti is later than the present time, the process proceeds to step S45, where the input processing unit 71 in the virtual device driver 53 sets the calculated transmission time Ti as the transmission time of the packet having the packet number "i." The process is thereby ended.

When the input processing unit 71 in the virtual device driver 53 determines in step S44 that the calculated transmission time Ti is not later than the present time, the calculated transmission time Ti has already passed, and hence the process proceeds to step S46.

Also, when the input processing unit 71 in the virtual device driver 53 determines in step S41 that the packet number i of the packet supplied from the network layer 51 is "0," the process proceeds to step S46, where the input processing unit 71 in the virtual device driver 53 sets the present time as the transmission time of the packet having the packet number "i." The process is thereby ended.

A packet dequeueing process by the virtual device driver 53 will next be described with reference to a flowchart of FIG. 5.

Each time an interrupt signal to obtain a packet is supplied from the kernel timer 54 to the virtual device driver 53, the virtual device driver 53 calls a predetermined function, and performs the packet dequeueing process.

In step S61, the virtual device driver 53 sets a transmitted packet number. The transmitted packet number refers to the packet number of a last transmitted packet among packets transmitted in the physical layer 16-1 or the physical layer 16-2 to a terminal device as a transmission destination. In other words, the transmitted packet number refers to the largest number among the packet numbers of the packets transmitted in the physical layer 16-1 or the physical layer 16-2 to the terminal device as the transmission destination. In this case, no packet is transmitted yet, and therefore the virtual device driver 53 sets "0" as the transmitted packet number.

Incidentally, when the transmitted packet number is "0," it is indicated that there is no transmitted packet yet.

In step S62, the output processing unit 72 in the virtual device driver 53 determines whether an interrupt signal is supplied from the kernel timer 54. When the output processing unit 72 in the virtual device driver 53 determines in step S62 that no interrupt signal is supplied, the process of step S62 is repeated until an interrupt signal is supplied.

When the output processing unit 72 in the virtual device driver 53 determines in step S62 that an interrupt signal is supplied, the process proceeds to step S63, where the output processing unit 72 in the virtual device driver 53 determines whether a present time is later than the transmission time of a packet having a same packet number as the transmitted packet number. When the output processing unit 72 in the virtual device driver 53 determines in step S63 that the present time is later than the transmission time, the packet is transmitted. The process therefore proceeds to step S64, where the output processing unit 72 in the virtual device driver 53 dequeues the packet whose transmission time has arrived.

The dequeueing of the packet refers to a process of obtaining the packet stored in the buffer 55 and having the same packet number as the transmitted packet number, and supplying (outputting) the packet to the device driver 56-1 or the device driver 56-2. Specifically, in step S64, the output processing unit 72 in the virtual device driver 53 obtains the packet which is disposed at the head (exit side) of the FIFO queue and whose transmission time has arrived from the buffer 55, and supplies the obtained packet to the device driver 56-1 or the device driver 56-2.

In step S65, the output processing unit 72 in the virtual device driver 53 increments the transmitted packet number.

In step S66, the output processing unit 72 in the virtual device driver 53 decrements the queue length Q. The process then returns to step S62.

When the output processing unit 72 in the virtual device driver 53 determines in step S63 that the present time is not later than the transmission time, on the other hand, the packet is not transmitted. A return is therefore made to step S62 to repeat the above-described process.

Since the frequency of occurrence of timer events of the kernel timer 54 is normally 100 Hz, the kernel timer 54 supplies an interrupt signal to the virtual device driver 53 every 10 msec. The granularity of traffic shaping control is 10 msec.

For example, when a packet having a fixed packet size of 1 Kbyte is transmitted with a shaping rate of 10 Mbps, the communication apparatus transmits data of 100 Kbits each time the kernel timer 54 supplies an interrupt signal to the virtual device driver 53. That is, since data of 100 Kbits corresponds to about 12 packets having a packet size of 1 Kbyte, the communication apparatus performs burst transfer of 12 packets each time the kernel timer 54 supplies an interrupt signal to the virtual device driver 53.

In a High-resolution timer, traffic shaping is performed using an APIC (Advanced Programmable Interrupt Controller) on an Intel's Pentium (registered trademark) processor (see Luca Abeni, Ashvin Goel, Charles Krasic, Jim Snow and Jonathan Walpole, "A Measurement-Based Analysis of the Real-Time Performance of Linux," IEEE RTAS 02, September, 2002). This APIC adjusts packet transmission intervals by making an OS generate a hardware interrupt after passage of an arbitrary time.

Further, there is a communication apparatus that performs traffic shaping by hardware in a communication network of an ATM (Asynchronous Transfer Mode) system.

Further, there is a communication apparatus in which a processor on a network card performs traffic shaping (see Japanese Patent Laid-Open Application No. 2001-211207, for example).

With the above-described techniques, however, it is not possible to control packet transmission intervals by software control without using special hardware for traffic shaping.

In addition, the control of packet transmission intervals by hardware imposes a heavy load on an OS, and is thus unsuitable for use with a high frequency.

Therefore, it is not possible to reduce delay fluctuations (jitter) in packet transmission, and realize data transmission with little delay.

SUMMARY OF THE INVENTION

The present invention has been made in view of such situations. It is desirable to enable control of packet transmission by software control with a lighter load and at shorter time intervals. In addition, it is desirable to control a process by software control at shorter time intervals.

According to an embodiment of the present invention, there is provided a transmission device including a buffer that stores packets disposed in a queue for transmission; determining means implemented by executing a program for determining whether a number of packets stored in the buffer is equal to or smaller than a second threshold value smaller than a first threshold value when the transmission of a selected packet is requested by requesting means; storing control means implemented by executing a program for controlling storing of the selected packet in the buffer so as to store the selected packet in the buffer when the determining means determines that the number of packets stored in the buffer is equal to or smaller than the second threshold value, and so as not to store the selected packet in the buffer when the determining means determines that the number of packets stored in the buffer exceeds the second threshold value; and output control means implemented by executing a program for controlling output of the selected packet stored in the buffer to a control program for controlling transmission of the selected packet by hardware based on the queue when the transmission of the selected packet is requested by the requesting means.

When the transmission of the selected packet is requested by the requesting means, the output control means can obtain the selected packet whose transmission time has arrived from the buffer, and control output of the obtained packet to the control program for controlling the transmission of the obtained packet by hardware.

When an interrupt process is requested at predetermined time intervals, the output control means can obtain the selected packet whose transmission time has arrived from the buffer, and control output of the obtained packet to the control program for controlling transmission of the obtained packet by hardware.

According to an embodiment of the present invention, there is provided a transmission method including determining whether a number of packets stored in a buffer is equal to or smaller than a second threshold value smaller than a first threshold value when transmission of a selected packet is requested; controlling storing of the selected packet in the buffer so as to store the selected packet in the buffer when it is determined that the number of packets stored in the buffer is equal to or smaller than the second threshold value, and so as not to store the selected packet in the buffer when it is determined that the number of packets stored in the buffer exceeds the second threshold value; and controlling output of the selected packet stored in the buffer to a control program for controlling the transmission of the selected packet by hardware based on a queue when the transmission of the selected packet is requested.

According to an embodiment of the present invention, there is provided a recording medium recorded with a program for executing a method for transmitting a packet via a communication network, the transmission method including determining whether a number of packets stored in a buffer is equal to or smaller than a second threshold value smaller than a first threshold value when transmission of a selected packet is requested; controlling storing of the selected packet in the buffer so as to store the selected packet in the buffer when it is determined that the number of packets stored in the buffer is equal to or smaller than the second threshold value, and so as not to store the selected packet in the buffer when it is determined that the number of packets stored in the buffer exceeds the second threshold value; and controlling output of the selected packet stored in the buffer to a control program for controlling the transmission of the selected packet by hardware based on a queue when the transmission of the selected packet is requested.

According to an embodiment of the present invention, there is provided a system for transmitting a packet via a communication network, the system including a processor operable to execute instructions; and instructions for executing a transmission method, the transmission method including determining whether a number of packets stored in a buffer is equal to or smaller than a second threshold value smaller than a first threshold value when the transmission of a selected packet is requested; controlling storing of the selected packet in the buffer so as to store the selected packet in the buffer when it is determined that the number of packets stored in the buffer is equal to or smaller than the second threshold value, and so as not to store the selected packet in the buffer when it is determined that the number of packets stored in the buffer exceeds the second threshold value; and controlling output of the selected packet stored in the buffer to a control program for controlling the transmission of the selected packet by hardware based on a queue when the transmission of the selected packet is requested.

The transmission device may be an independent device, or a block that performs the transmission process of a communication apparatus.

According to an embodiment of the present invention, there is provided a control device including requesting means for requesting a process to be performed, and for repeatedly requesting the same process to be performed when the requested process is not performed; first performance control means for controlling the performance of the requested process so as to make the requesting means continue requesting the requested process to be performed; and second performance control means for controlling the performance of another process when the requesting means requests the process to be performed.

In the transmission device and the transmission method, the recording medium, and the program according to the embodiments of the present invention, whether a number of packets stored in a buffer is equal to or smaller than a second threshold value smaller than a first threshold value is determined when transmission of a selected packet is requested by requesting means, storing of the selected packet in the buffer is controlled so as to store the selected packet in the buffer when it is determined that the number of packets stored in the buffer is equal to or smaller than the second threshold value, and so as not to store the selected packet in the buffer when it is determined that the number of packets stored in the buffer exceeds the second threshold value, and output of the selected packet stored in the buffer to a control program for controlling the transmission of the selected packet by hardware is controlled based on a queue when the transmission of the selected packet is requested by the requesting means.

In the control device according to the embodiment of the present invention, a process is requested to be performed, and the same process is repeatedly requested to be performed when the requested process is not performed, the performance of the requested process is controlled so as to make the requesting means continue requesting the process to be performed, and the performance of another process is controlled when the requesting means requests the process to be performed.

A network is a mechanism in which at least two devices are connected to each other so that information can be transmitted from one device to another device. The devices communicating via the network may be independent devices, or may be internal blocks forming one apparatus.

Communication may of course be wireless communication and wire communication, or communication in which wireless communication and wire communication are mixed with each other, that is, communication in which wireless communication is performed in a means and wire communication is performed in another means. Further, communication may be such that wire communication is performed from one device to another device and wireless communication is performed from the other device to the one device.

According to the present invention, it is possible to transmit data. In addition, according to the present invention, it is possible to control packet transmission by software control with a lighter load and at shorter time intervals. Further, according to the present invention, it is possible to control a process by software control at shorter time intervals.

DETAILED DESCRIPTION

Figure 1:
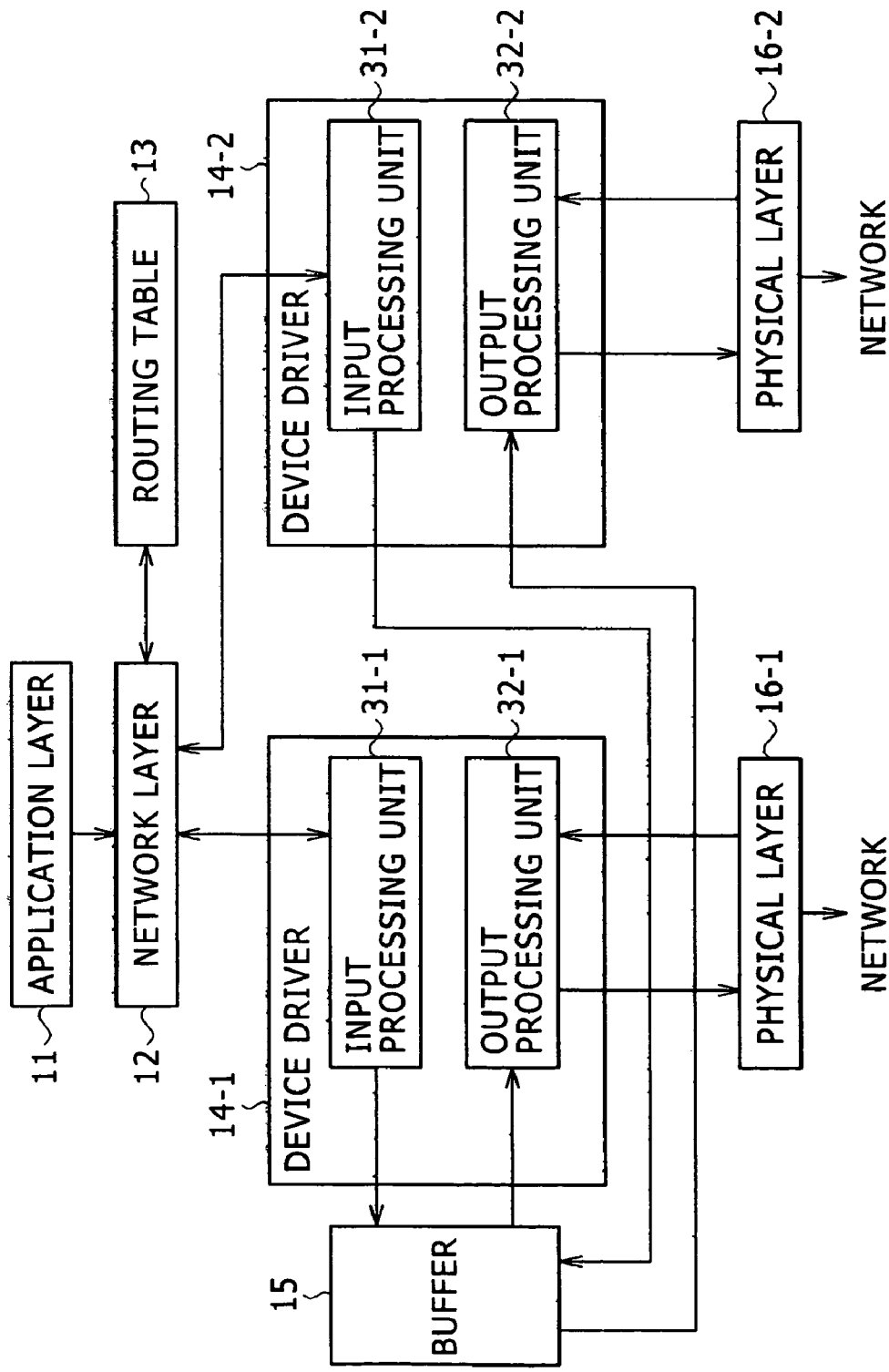
FIG. 1 is a block diagram showing a configuration of functions implemented by a conventional communication apparatus calling an application program and functions of a kernel of an operating system.
Figure 2:
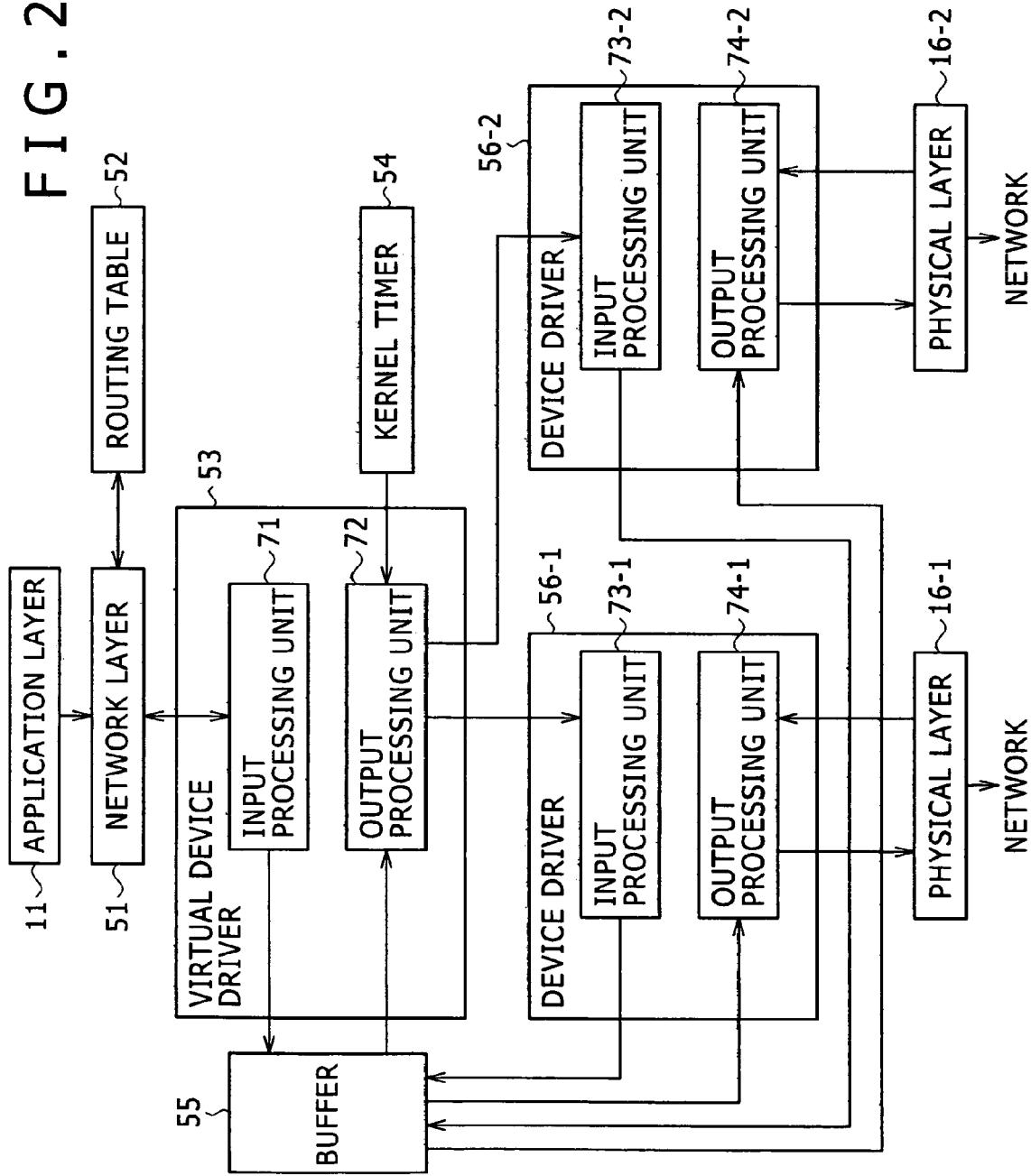
FIG. 2 is a block diagram showing a functional configuration of a conventional communication apparatus that controls an amount of traffic.
Figure 3:
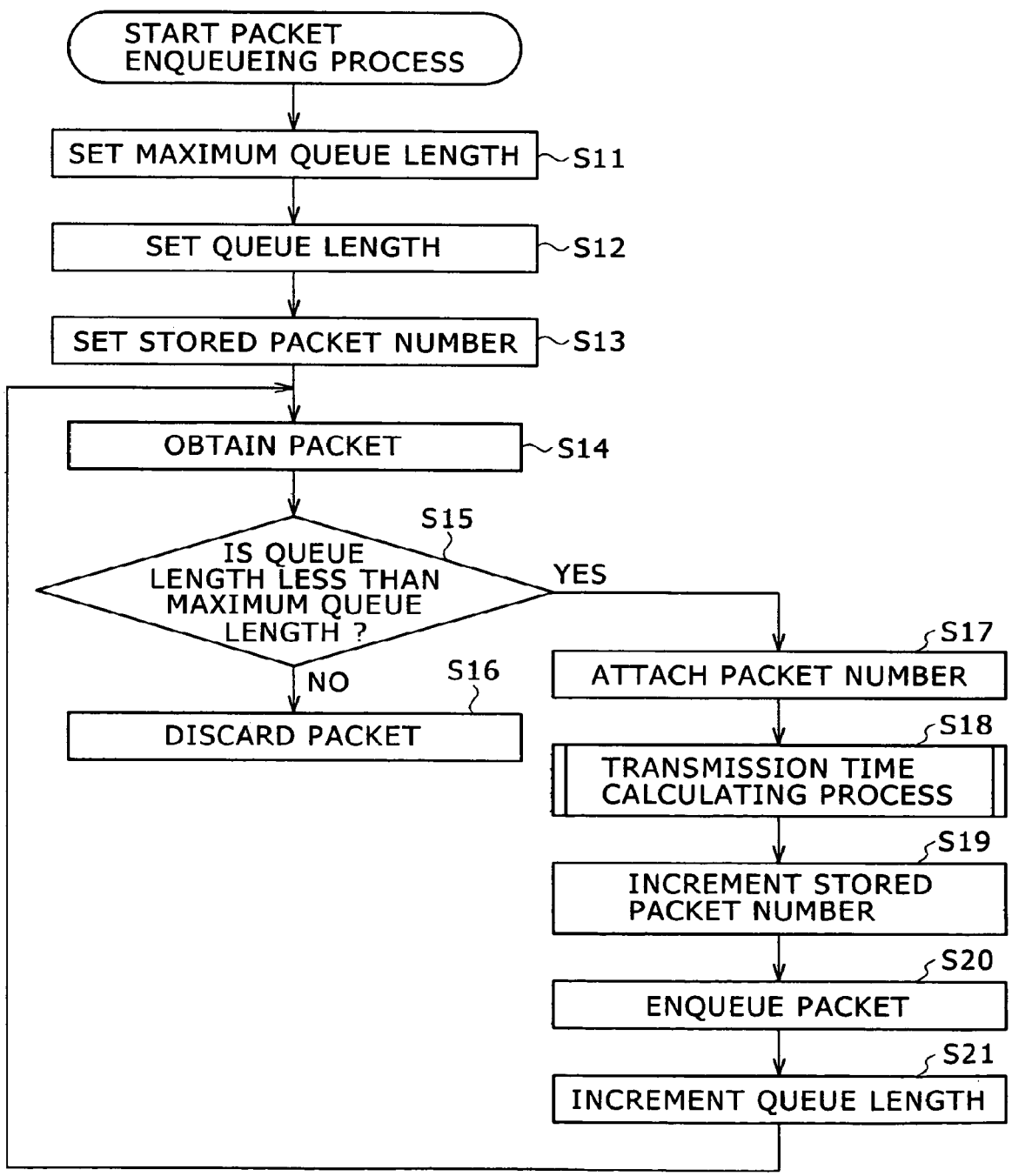
FIG. 3 is a flowchart of assistance in explaining a packet enqueueing process.
Figure 4:
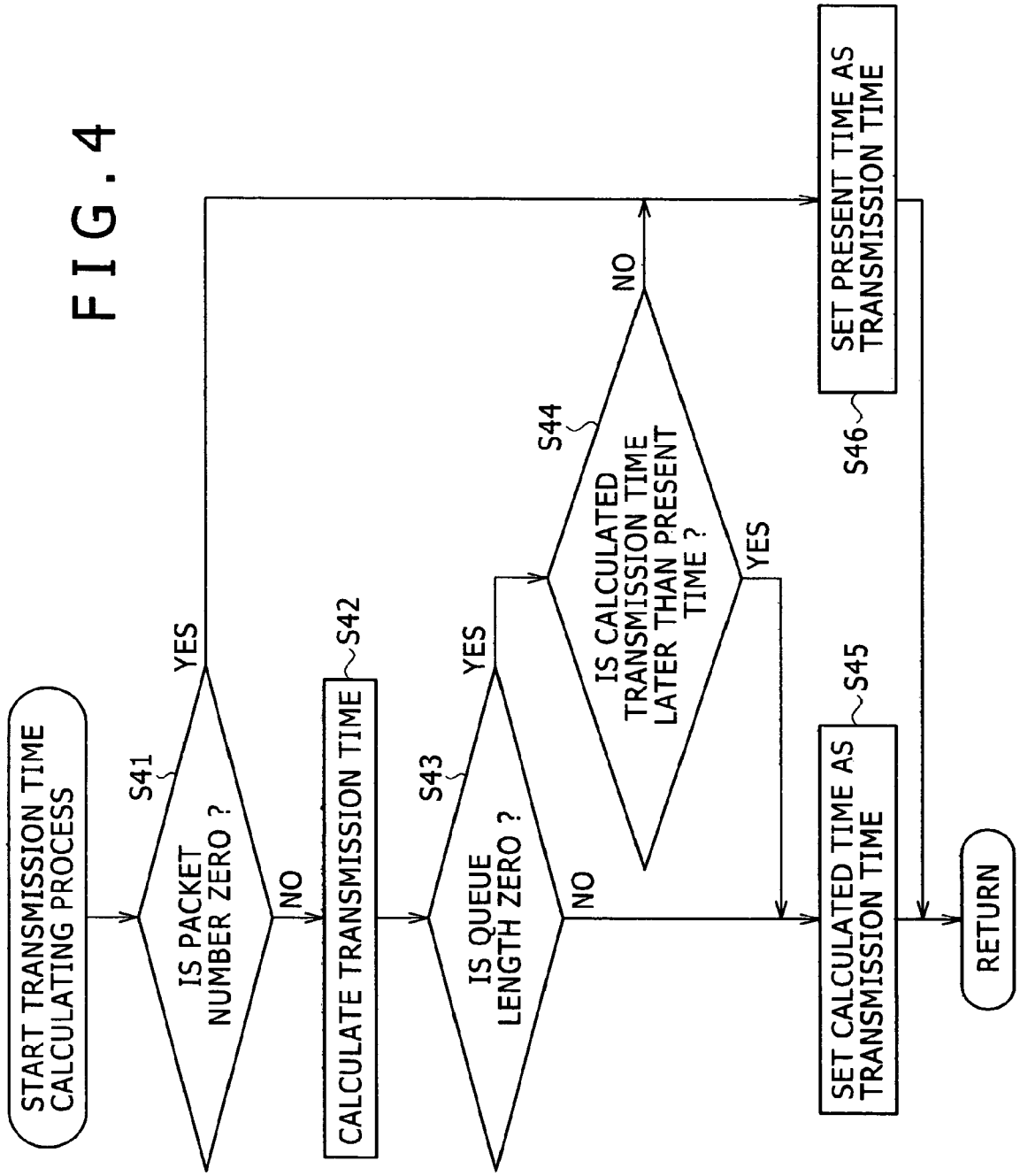
FIG. 4 is a flowchart of assistance in explaining a transmission time calculating process.
Figure 5:
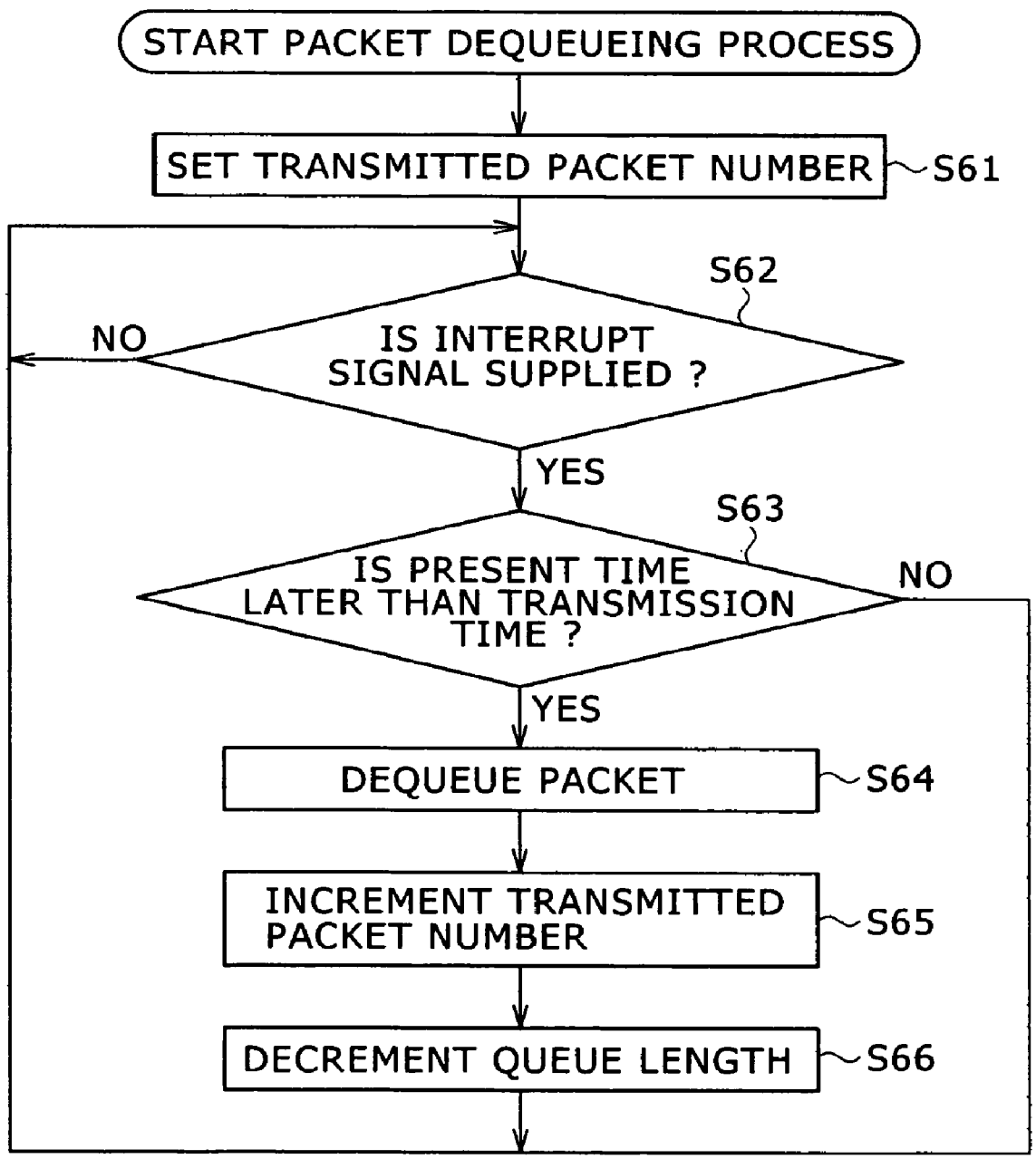
FIG. 5 is a flowchart of assistance in explaining a packet dequeueing process.

Preferred embodiments of the present invention will hereinafter be described. Correspondences between inventions described in the present specification and embodiments of the inventions are illustrated as follows. This description is to confirm that embodiments supporting inventions described in the present specification are described in the present specification. Therefore, even when there is an embodiment described in the embodiments of the inventions but not described here as corresponding to an invention, it does not mean that the embodiment does not correspond to the invention. Conversely, even when an embodiment is described here as corresponding to an invention, it does not mean that the embodiment does not correspond to inventions other than that invention.

Further, this description does not represent all the inventions described in the present specification. In other words, this description does not negate presence of inventions described in the present specification but not claimed in the present application, that is, presence of inventions to be presented or added by a divisional application or an amendment in the future.

A transmission device in accordance with aspects of the invention includes: determining means (for example a determining unit 232 in FIG. 8) implemented by executing a program, for determining whether a number of packets stored in a buffer (for example a buffer 176 in FIG. 7) is equal to or smaller than a second threshold value smaller than a first threshold value when transmission of a packet is requested by requesting means (for example a program executed in a network layer 172 in FIG. 7); storing control means (for example an input control unit 231 in FIG. 8) implemented by executing a program, for controlling storing of the packet in the buffer so as to store, in the buffer, the packet the transmission of which is requested by the requesting means when the determining means determines that the number of packets stored in the buffer is equal to or smaller than the second threshold value, and so as not to store, in the buffer, the packet the transmission of which is requested by the requesting means when the determining means determines that the number of packets stored in the buffer exceeds the second threshold value; and output control means (for example an output control unit 236 in FIG. 8) implemented by executing a program, for controlling output of the packet stored in the buffer to a control program for controlling transmission of the packet by hardware on a basis of a queue when the transmission of the packet is requested by the requesting means.

In an embodiment of the transmission device, when transmission of a packet is requested by the requesting means (for example a program executed in a network layer 172 in FIG. 7), the output control means (for example an output control unit 236 in FIG. 8) can obtain the packet whose transmission time has arrived from the buffer, and control output of the obtained packet to the control program for controlling the transmission of the packet by hardware.

In another embodiment of the transmission device, when an interrupt process is requested at predetermined time intervals, the output control means (for example an output control unit 236 in FIG. 8) can obtain a packet whose transmission time has arrived from the buffer, and control output of the obtained packet to the control program for controlling transmission of the packet by hardware.

Figure 7:
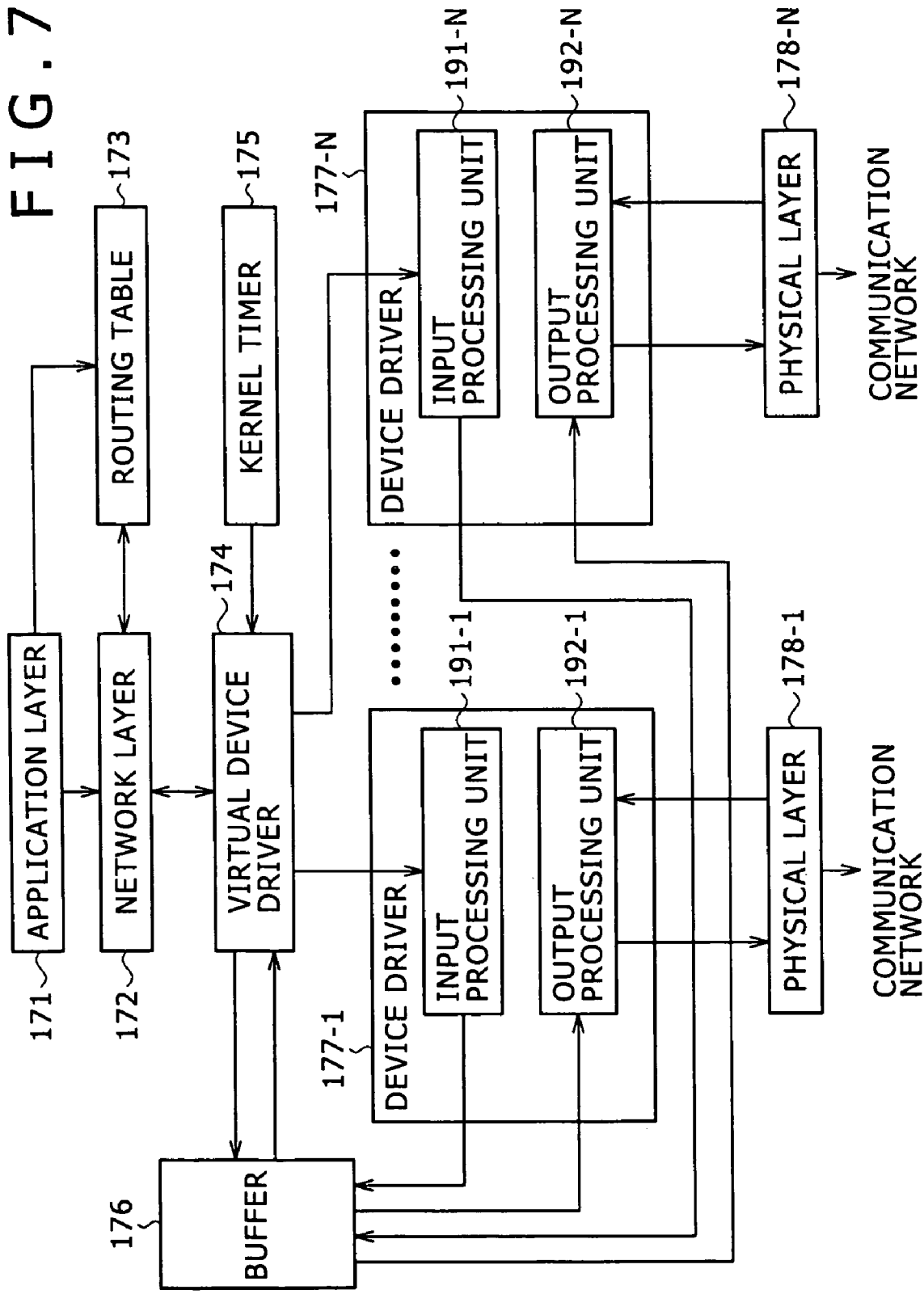
FIG. 7 is a block diagram showing a functional configuration of a CPU that executes a program.
Figure 9:
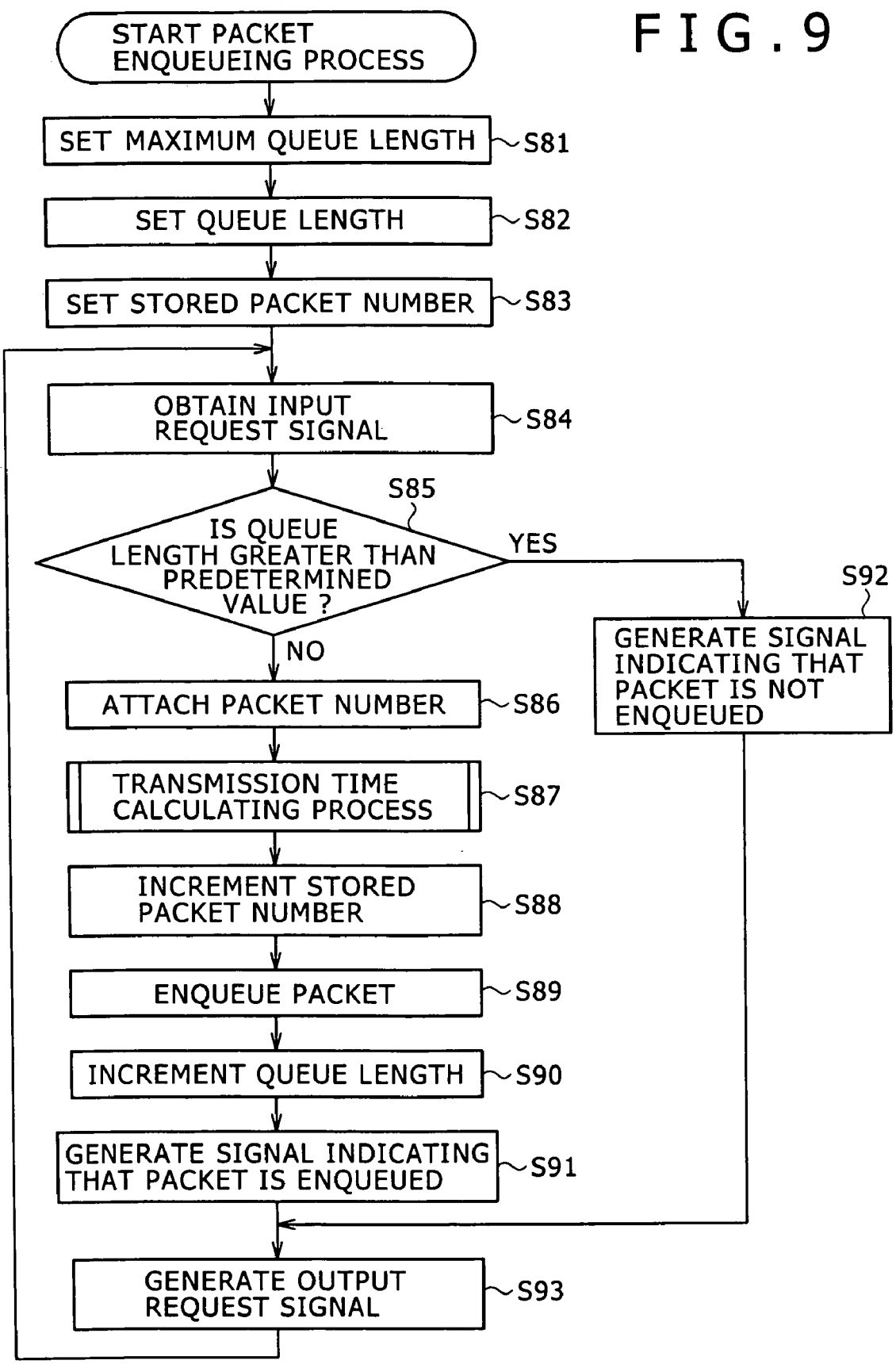
FIG. 9 is a flowchart of assistance in explaining a packet enqueueing process.

A transmission method in accordance with aspects of the invention includes: a determining step (for example the process of step S85 in FIG. 9) of determining whether a number of packets stored in a buffer (for example a buffer 176 in FIG. 7) is equal to or smaller than a second threshold value smaller than a first threshold value when transmission of a packet is requested in a requesting step of requesting the transmission of the packet (for example a process of supplying an input request signal to a virtual device driver 174 by a program executed in a network layer 172 in FIG. 7); a storing control step (for example the process of step S89 or the process of step S92 in FIG. 9) of controlling storing of the packet in the buffer so as to store, in the buffer, the packet the transmission of which is requested in the requesting step when it is determined that the number of packets stored in the buffer is equal to or smaller than the second threshold value, and so as not to store, in the buffer, the packet the transmission of which is requested in the requesting step when it is determined that the number of packets stored in the buffer exceeds the second threshold value; and an output control step (for example the process of step S134 in FIG. 11) of controlling output of the packet stored in the buffer to a control program for controlling transmission of the packet by hardware on a basis of a queue when the transmission of the packet is requested in the requesting step.

In another aspect of the invention, a recording medium is recorded with a computer readable program for executing the inventive method of transmitting a packet via a communication network. In still another aspect of the invention, a system for transmitting a packet via a communication network comprises a processor operable to execute instructions for executing the inventive transmission method.

A control device in accordance with aspects of the invention includes: requesting means (for example a program executed in a network layer 172 in FIG. 7) implemented by executing a process, for requesting a process to be performed, and repeatedly requesting the same process to be performed when the requested process is not performed; first performance control means (for example an input processing unit 211 in FIG. 8) implemented by executing a process, for controlling the performance of the requested process so as to make the requesting means continue requesting the process to be performed when the requesting means requests the process to be performed; and second performance control means (for example an output processing unit 214 in FIG. 8) implemented by executing a process, for controlling performance of another process when the requesting means requests the process to be performed.

The present invention is applicable to communication systems that transmit streaming data in real time, such for example as Internet telephones, teleconferencing systems, live video streaming distribution systems, or television telephones.

An embodiment to which the present invention is applied will hereinafter be described with reference to the drawings.

Figure 6:
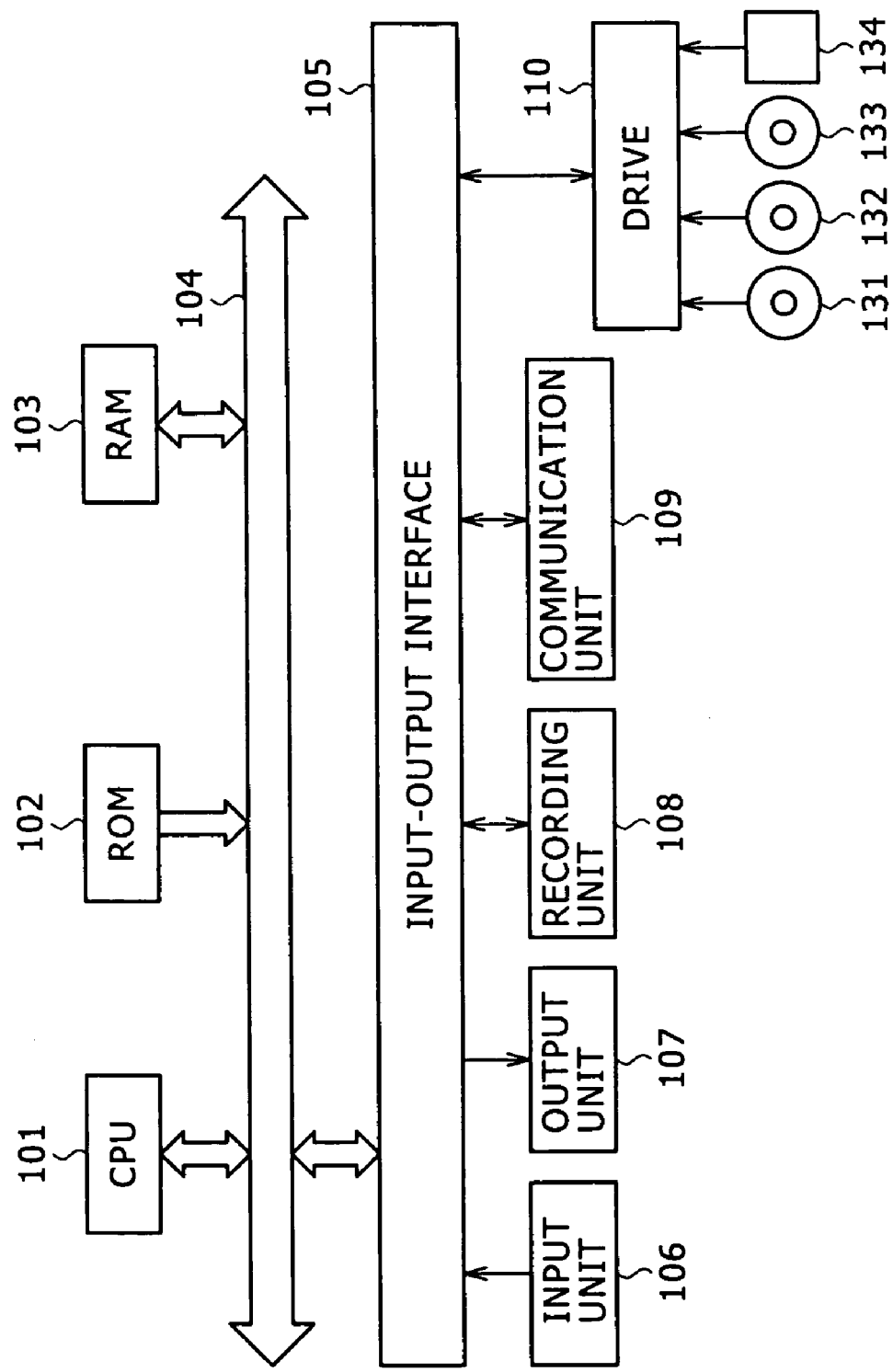
FIG. 6 is a block diagram showing an example of configuration of a communication apparatus to which the present invention is applied.

FIG. 6 is a block diagram showing an example of configuration of a communication apparatus to which the present invention is applied.

A CPU (Central Processing Unit) 101 performs various processes according to a program recorded in a ROM (Read Only Memory) 102 or a recording unit 108. A RAM (Random Access Memory) 103 stores a program being executed by the CPU 101, data and the like as required. The CPU 101, the ROM 102, and the RAM 103 are interconnected via a bus 104.

The CPU 101 is also connected with an input-output interface 105 via the bus 104. The input-output interface 105 is connected with an input unit 106 including a keyboard, a mouse, a switch and the like, and an output unit 107 including a display, a speaker, a lamp and the like. The CPU 101 performs various processes in response to a command input from the input unit 106.

The recording unit 108 connected to the input-output interface 105 is formed by a hard disk, for example. The recording unit 108 records programs to be executed by the CPU 101 and various data. A communication unit 109 is formed by a network card, for example. The communication unit 109 communicates with an external apparatus via a communication network such as the Internet or another network.

The communication unit 109 may also obtain a program via the communication network, and record the program in the recording unit 108.

A drive 110 connected to the input-output interface 105 drives a magnetic disk 131, an optical disk 132, a magneto-optical disk 132, a semiconductor memory 134 and the like when they are loaded into the drive 110, and obtains a program, data or the like recorded there. The obtained program or data is transferred to the recording unit 108 to be recorded in the recording unit 108 as required.

FIG. 7 is a block diagram showing a functional configuration of the CPU 101 that executes a program.

Data specified to be transmitted by a user in an application layer 171 is supplied from the application layer 171 to a network layer 172. In the network layer 172, data supplied from the application layer 171 is stored in a packet.

After the data is stored in the packet, an input request signal requesting the enqueueing of the packet is generated in the network layer 172. In the network layer 172, a route in a communication network which route is determined by a transmission destination of the packet is set by referring to a routing table 173, and the generated input request signal is supplied to a virtual device driver 174.

Specifically, the routing table 173 includes information indicating an address of a terminal device (communication device) connected to the communication network and a route (gateway) to the terminal device in the communication network. When the data (packet) supplied from the application layer 171 to the network layer 172 is transmitted via one of device drivers 177-1 to 177-N, a virtual output interface not shown in the figure is set as an output interface determined by the destination of the packet. The input request signal is supplied to the virtual device driver 174 corresponding to the virtual output interface. The routing table 173 is updated by a program executed in the application layer 171.

When a signal indicating that the packet is not enqueued is supplied from the virtual device driver 174 to the network layer 172, an input request signal requesting the enqueueing of the packet not enqueued is generated in the network layer 172. The generated input request signal is supplied to the virtual device driver 174. That is, a program executed in the network layer 172 requests a predetermined process such for example as the process of enqueueing a packet, and repeatedly requests the performance of the same process when the requested process is not performed.

Also, the packet in which the data is stored is supplied from the network layer 172 to the virtual device driver 174.

When the input request signal is supplied from the network layer 172 to the virtual device driver 174, the virtual device driver 174 determines whether the packet can be enqueued on the basis of a queue length Q of packets stored in a buffer 176 and a maximum queue length Qm.

The maximum queue length Qm refers to a maximum number of packets that can be stored in the buffer 176. The queue length Q refers to the number of packets stored in the buffer 176.

When the virtual device driver 174 determines that the packet can be enqueued, the virtual device driver 174 obtains the packet from the network layer 172, supplies the obtained packet to the buffer 176, and disposes the packet in a queue such as a FIFO queue or the like. Then, the virtual device driver 174 generates a signal indicating that the packet is enqueued, and supplies the generated signal indicating that the packet is enqueued to the network layer 172.

When the virtual device driver 174 determines that the packet cannot be enqueued, the virtual device driver 174 does not obtain the packet from the network layer 172. The virtual device driver 174 generates a signal indicating that the packet is not enqueued, and supplies the generated signal indicating that the packet is not enqueued to the network layer 172.

When an interrupt signal to obtain a packet is supplied from a kernel timer 175 to the virtual device driver 174, or when an input request signal requesting the enqueueing of a packet is supplied from the network layer 172 to the virtual device driver 174, the virtual device driver 174 obtains a packet whose transmission time has arrived among packets stored in the buffer 176, and supplies the obtained packet to one of the device drivers 177-1 to 177-N.

The kernel timer 175 generates an interrupt signal to obtain a packet at predetermined time intervals (for example 10 msec), and supplies the generated interrupt signal to the virtual device driver 174. That is, the kernel timer 175 generates an interrupt signal to obtain a packet each time a timer event occurs, and supplies the generated interrupt signal to the virtual device driver 174.

The buffer 176 is formed by a predetermined storage area in the RAM 103, for example. The buffer 176 stores a packet supplied from one of the device drivers 177-1 to 177-N or the virtual device driver 174 in a storage area as a queue such as a FIFO queue. The buffer 176 supplies a packet stored therein to one of the device drivers 177-1 to 177-N or the virtual device driver 174.

The device drivers 177-1 to 177-N (the device drivers 177-2 to 177-(N−1) are not shown in the figure) control respective physical devices (physical layers 178-1 to 178-N (the physical layers 178-2 to 178-(N−1) are not shown in the figure)). The device drivers 177-1 to 177-N have a function of synchronizing processes between an OS and the respective physical devices (the physical layers 178-1 to 178-N).

The device drivers 177-1 to 177-N have respective input processing units 191-1 to 191-N and respective output processing units 192-1 to 192-N.

The input processing units 191-1 to 191-N of the device drivers 177-1 to 177-N each supply a packet supplied from the virtual device driver 174 to the buffer 176.

When an interrupt signal indicating that packet transmission is completed is supplied from the physical layers 178-1 to 178-N to the output processing units 192-1 to 192-N of the device drivers 177-1 to 177-N, respectively, the output processing units 192-1 to 192-N obtain a packet from the buffer 176, and supply the obtained packet to the respective physical layers 178-1 to 178-N.

More specifically, for example, the virtual device driver 174 and the device drivers 177-1 to 177-N arrange, in a queue, pointers indicating addresses of the buffer 176 where packets are stored. The virtual device driver 174 and the device drivers 177-1 to 177-N thus input a packet and output a packet in order based on the queue without moving the packets in the buffer 176.

When the device drivers 177-1 to 177-N do not need to be individually differentiated from each other, the device drivers 177-1 to 177-N will hereinafter be referred to simply as a device driver 177. Also, when the input processing units 191-1 to 191-N do not need to be individually differentiated from each other, the input processing units 191-1 to 191-N will hereinafter be referred to simply as an input processing unit 191. Further, when the output processing units 192-1 to 192-N do not need to be individually differentiated from each other, the output processing units 192-1 to 192-N will hereinafter be referred to simply as an output processing unit 192.

The physical layers 178-1 to 178-N are each formed by a network card or the like for connection to Ethernet (registered trademark) or an optical communication network such as a baseband communication network or a broadband communication network, for example. The physical layers 178-1 to 178-N convert a packet supplied from the device driver 177 into an electric signal or an optical signal, and then transmit the packet converted into the electric signal or the optical signal to a terminal device of transmission destination via a network or a communication network such as the Internet or the like. After transmitting the packet supplied from the device driver 177, the physical layers 178-1 to 178-N each generate an interrupt signal indicating that packet transmission is completed, and supply the generated interrupt signal to the device driver 177.

When the physical layers 178-1 to 178-N do not need to be individually differentiated from each other, the physical layers 178-1 to 178-N will hereinafter be referred to simply as a physical layer 178.

Figure 8:
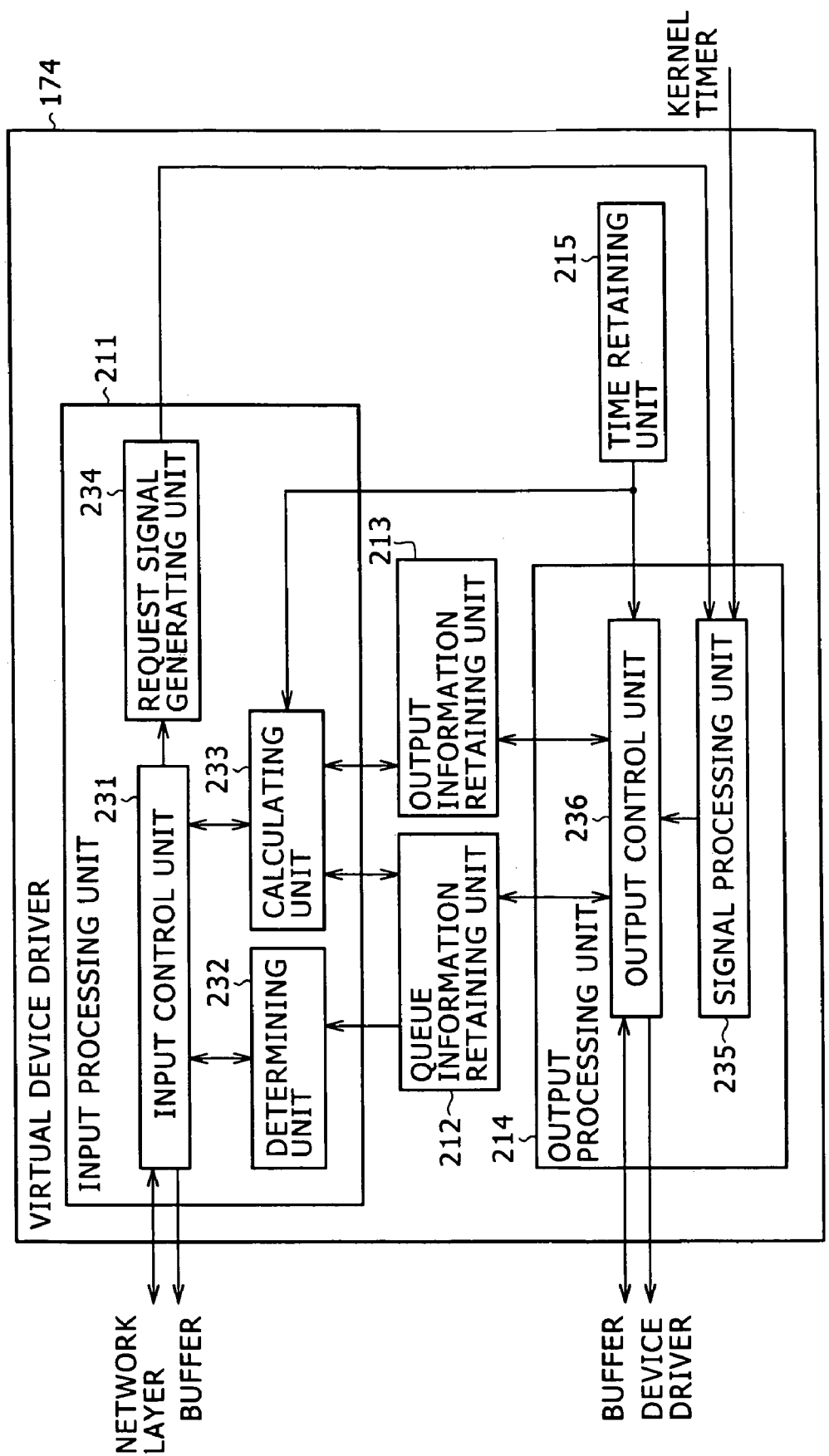
FIG. 8 is a block diagram showing a functional configuration of a virtual device driver.

FIG. 8 is a block diagram showing a functional configuration of the virtual device driver 174.

The virtual device driver 174 includes an input processing unit 211, a queue information retaining unit 212, an output information retaining unit 213, an output processing unit 214, and a time retaining unit 215.

The input processing unit 211 obtains a packet from the network layer 172, and supplies the obtained packet to the buffer 176. The input processing unit 211 has an input control unit 231, a determining unit 232, a calculating unit 233, and a request signal generating unit 234.

When an input request signal requesting the enqueueing of a packet is supplied from the network layer 172 to the input control unit 231, the input control unit 231 generates a determination request signal requesting the determination of whether the packet can be enqueued, and supplies the generated determination request signal to the determining unit 232.

When a signal indicating that the packet can be enqueued is supplied from the determining unit 232 to the input control unit 231, the input control unit 231 obtains the packet from the network layer 172, and attaches a packet number i to the obtained packet. After adding the packet number i, the input control unit 231 generates packet information including information indicating the size, the packet number i and the like of the obtained packet, and supplies the generated packet information to the calculating unit 233.

The packet number i is a number for identifying the packet. Packet numbers are attached in ascending order starting with "1." Incidentally, when the packet number i is "0," the packet number indicates that no packet is supplied to the input control unit 231 yet.

When a signal indicating that a transmission time is set is supplied from the calculating unit 233 to the input control unit 231, the input control unit 231 supplies the obtained packet to the buffer 176. Incidentally, the process of enqueueing the packet by the input control unit 231 will hereinafter be referred to also as a packet input process. After supplying the packet to the buffer 176, the input control unit 231 generates a signal indicating that the packet is enqueued, and supplies the generated signal indicating that the packet is enqueued to the network layer 172.

When a signal indicating that the packet cannot be enqueued is supplied from the determining unit 232 to the input control unit 231, the input control unit 231 generates a signal indicating that the packet is not enqueued, and supplies the generated signal indicating that the packet is not enqueued to the network layer 172.

That is, the input control unit 231 controls the storing of the packet in the buffer 176 by generating a signal indicating that the packet is enqueued or a signal indicating that the packet is not enqueued and supplying the signal indicating that the packet is enqueued or the signal indicating that the packet is not enqueued to the network layer 172.

After the enqueueing of the packet is requested by the network layer 172, that is, after supplying the signal indicating that the packet is enqueued or the signal indicating that the packet is not enqueued to the network layer 172, to request the dequeueing of a packet, the input control unit 231 generates a signal to generate an output request signal, and supplies the generated signal to generate an output request signal to the request signal generating unit 234.

When a determination request signal is supplied from the input control unit 231 to the determining unit 232, the determining unit 232 determines whether the enqueueing of the packet in the buffer 176 is possible on the basis of the maximum queue length Qm and the queue length Q retained by the queue information retaining unit 212.

The maximum queue length Qm refers to a maximum number of packets that can be stored in the buffer 176. The queue length Q refers to the number of packets stored in the buffer 176. When "0" is set as the packet queue length Q, the queue length Q indicates that no packet is stored in the buffer 176.

When the determining unit 232 determines that the packet can be enqueued, the determining unit 232 generates a signal indicating that the packet can be enqueued, and supplies the generated signal indicating that the packet can be enqueued to the input control unit 231. When the determining unit 232 determines that the packet cannot be enqueued, the determining unit 232 generates a signal indicating that the packet cannot be enqueued, and supplies the generated signal indicating that the packet cannot be enqueued to the input control unit 231.

When packet information is supplied from the input control unit 231, the calculating unit 233 calculates the transmission time of the packet on the basis of the supplied packet information, a shaping rate, the transmission time of a packet having an immediately preceding packet number, and the packet size of the packet having the immediately preceding packet number retained in the output information retaining unit 213, and a present time supplied from the time retaining unit 215. The calculating unit 233 supplies the calculated transmission time and the packet information to the output information retaining unit 213. The packet having the immediately preceding packet number refers to a packet having a packet number "1" for a packet having a packet number "2," for example.

After calculating the transmission time of the packet, the calculating unit 233 makes the queue information retaining unit 212 increment the queue length Q retained by the queue information retaining unit 212. Also, after calculating the transmission time of the packet, the calculating unit 233 makes the output information retaining unit 213 increment a stored packet number retained by the output information retaining unit 213. The stored packet number refers to the packet number of a last stored packet among packets stored in the buffer 176 by the input control unit 231. When the stored packet number is "0," it is indicated that no packet is stored in the buffer 176 yet.

After calculating the transmission time of the packet, the calculating unit 233 generates a signal indicating that the transmission time is set, and supplies the signal indicating that the transmission time is set to the input control unit 231.

When a signal to generate an output request signal is supplied from the input control unit 231 to the request signal generating unit 234, the request signal generating unit 234 generates an output request signal requesting the dequeueing of a packet, and supplies the generated output request signal to the output processing unit 214.

The queue information retaining unit 212 retains the queue length Q of packets stored in the buffer 176 and a predetermined maximum queue length Qm.

Under control of the input processing unit 211, the queue information retaining unit 212 increments the retained queue length Q. Under control of the output processing unit 214, the queue information retaining unit 212 decrements the retained queue length Q.

The output information retaining unit 213 retains the predetermined shaping rate, the packet transmission time and the packet information supplied from the input processing unit 211, the stored packet number, and a transmitted packet number. The transmitted packet number refers to the packet number of a last transmitted packet among packets transmitted in the physical layer 178 to a terminal device as a transmission destination. In other words, the transmitted packet number refers to the largest number among the packet numbers of the packets transmitted in the physical layer 178 to the terminal device as the transmission destination. Incidentally, when the transmitted packet number is "0," it is indicated that there is no transmitted packet yet.

Under control of the input processing unit 211, the output information retaining unit 213 increments the stored packet number retained by the output information retaining unit 213. Also, under control of the output processing unit 214, the output information retaining unit 213 increments the transmitted packet number retained by the output information retaining unit 213.

The output processing unit 214 obtains a packet from the buffer 176 in predetermined timing, and supplies the obtained packet to the device driver 177. The output processing unit 214 has a signal processing unit 235 and an output control unit 236.

When an output request signal is supplied from the input processing unit 211 to the signal processing unit 235, or when an interrupt signal is supplied from the kernel timer 175 to the signal processing unit 235, the signal processing unit 235 generates a signal to dequeue a packet, and supplies the generated signal to dequeue a packet to the output control unit 236.

When the signal to dequeue a packet is supplied from the signal processing unit 235 to the output control unit 236, the output control unit 236 determines whether there is a packet to be transmitted next whose transmission time has arrived on the basis of packet transmission time and packet information retained by the output information retaining unit 213 and the present time supplied from the time retaining unit 215. The output control unit 236 obtains the packet to be transmitted next whose transmission time has arrived from the buffer 176. The output control unit 236 supplies the packet obtained from the buffer 176 to the device driver 177.

In other words, when a signal to dequeue a packet is supplied from the signal processing unit 235 to the output control unit 236, the output control unit 236 supplies the packet obtained from the buffer 176 on the basis of a packet queue, whereby the output control unit 236 controls output of the packet stored in the buffer 176 to a control program for controlling packet transmission by hardware (device (physical layers 178-1 to 178-N)).

Incidentally, the process of dequeueing a packet by the output control unit 236 will hereinafter be referred to also as a packet output process.

The output control unit 236 makes the queue information retaining unit 212 decrement the queue length Q retained by the queue information retaining unit 212. The output control unit 236 also makes the output information retaining unit 213 increment the transmitted packet number retained by the output information retaining unit 213.

The time retaining unit 215 measures time on the basis of the kernel timer 175, and retains the present time. The time retaining unit 215 supplies the retained present time to the input processing unit 211 or the output processing unit 214. The time retaining unit 215 may also be an RTC (Real Time Clock), for example.

The process of enqueueing a packet by the virtual device driver 174 will next be described with reference to a flowchart of FIG. 9.

Each time an input request signal is supplied from the network layer 172 to the virtual device driver 174, the virtual device driver 174 calls a predetermined function such for example as an input function, and performs the process of enqueueing a packet (input process).

In step S81, the virtual device driver 174 sets a maximum queue length Qm for packets to be stored in the buffer 176. For example, in step S81, the virtual device driver 174 sets "5" as the maximum queue length Qm retained by the queue information retaining unit 212.

In step S82, the virtual device driver 174 sets the queue length Q of packets stored in the buffer 176. For example, in this case, no packet is stored in the buffer 176 yet, and therefore the virtual device driver 174 sets "0" as the queue length Q retained by the queue information retaining unit 212.

In step S83, the virtual device driver 174 sets a stored packet number. For example, in this case, no packet is stored in the buffer 176 yet, and therefore the virtual device driver 174 sets "0" as the stored packet number retained by the output information retaining unit 213.

In step S84, the input control unit 231 obtains an input request signal from the network layer 172. Obtaining the input request signal, the input control unit 231 generates a determination request signal requesting the determination of whether a packet can be enqueued, and supplies the generated determination request signal to the determining unit 232.

When the determination request signal is supplied from the input control unit 231, the determining unit 232 in step S85 determines whether the queue length Q is greater than a predetermined value on the basis of the queue length Q and the maximum queue length Qm retained in the queue information retaining unit 212.

For example, in step S85, the determining unit 232 calculates Equation (3) on the basis of the queue length Q and the maximum queue length Qm retained in the queue information retaining unit 212, and determines whether the queue length Q is greater than the predetermined value by determining whether the queue length Q and the maximum queue length Qm satisfy Equation (3).

$$(Qm/2) \leq Q+1 \quad (3)$$

That is, by determining whether the queue length Q of packets stored in the buffer 176 is greater than the value of half of the maximum queue length Qm, the determining unit 232 determines whether the queue length Q is greater than the predetermined value.

Hence, when the queue length Q and the maximum queue length Qm satisfy Equation (3), the determining unit 232 determines that the queue length Q is greater than the predetermined value.

In a UNIX (registered trademark) operating system such as Linux or the like, for example, when enqueued packets reach the maximum queue length, a program in the higher network layer 172 temporarily stops supplying a packet to be enqueued. The stopped supply of packets is resumed when packets in the queue are transmitted and the queue length becomes less than half of the maximum queue length. That is, when the queue length is always maintained at less than half of the maximum queue length, the program in the network layer attempts making the enqueueing process performed as long as possible. Hence, by keeping the queue length Q less than half of the maximum queue length Qm at all times, for example, it is possible to increase the number of times that an input request signal is obtained, and consequently increase the number of times that the packet output process is performed.

In other words, when a process such as the packet enqueueing process or the like is requested by the network layer 172, the input processing unit 211 controls the performance of the requested process so as to make the program executed in the network layer 172 continue requesting the performance of the process by keeping the queue length less than half of the maximum queue length at all times, for example. The input processing unit 211 thus increases the number of times that another process such as the packet output process or the like is performed.

When the determining unit 232 determines in step S85 that the queue length Q is not greater than the predetermined value, a packet can be stored in the buffer 176, and therefore the determining unit 232 generates a signal indicating that the packet can be enqueued. Then, the determining unit 232 supplies the generated signal indicating that the packet can be enqueued to the input control unit 231. The process proceeds to step S86.

When the signal indicating that the packet can be enqueued is supplied from the determining unit 232, the input control unit 231 in step S86 obtains the packet from the network layer 172, and attaches a packet number i to the obtained packet. After attaching the packet number i to the obtained packet, the input control unit 231 generates packet information including information indicating the size, the packet number i and the like of the obtained packet, and supplies the generated packet information to the calculating unit 233.

Incidentally, more specifically, in this case, the input control unit 231 obtains a pointer indicating the address of a storage area where the packet is stored from the network layer 172. Processes of sending and receiving the packet in the virtual device driver 174 are performed using the pointer.

In step S87, the calculating unit 233 performs a transmission time calculating process. While details of the transmission time calculating process will be described later, the calculating unit 233 in the transmission time calculating process calculates the transmission time of the packet supplied from the network layer 172 on the basis of the packet information supplied from the input control unit 231, the shaping rate, the transmission time of a packet having an immediately preceding packet number, and the packet size of the packet having the immediately preceding packet number retained in the output information retaining unit 213, and the present time supplied from the time retaining unit 215.

In step S88, the output information retaining unit 213 increments the stored packet number retained by the output information retaining unit 213 under control of the calculating unit 233. For example, when the stored packet number retained by the output information retaining unit 213 is "1," the output information retaining unit 213 in step S88 increments the stored packet number so as to make the stored packet number retained by the output information retaining unit 213 become "2" under control of the calculating unit 233.

In step S89, the input control unit 231 enqueues the packet obtained from the network layer 172. Specifically, in step S89, the input control unit 231 supplies the packet obtained from the network layer 172 to the buffer 176, and disposes the packet in a queue such as a FIFO queue or the like. The buffer 176 stores the packet supplied from the virtual device driver 174.

In step S90, the queue information retaining unit 212 increments the queue length Q retained by the queue information retaining unit 212 under control of the calculating unit 233. For example, when the queue length Q retained by the queue information retaining unit 212 is "2," the queue information retaining unit 212 in step S90 increments the queue length Q so as to make the queue length Q retained by the queue information retaining unit 212 become "3" under control of the calculating unit 233.

In step S91, the input control unit 231 generates a signal indicating that the packet is enqueued, and supplies the generated signal indicating that the packet is enqueued to the network layer 172. The input control unit 231 generates a signal to generate an output request signal, and supplies the generated signal to generate an output request signal to the request signal generating unit 234.

On the other hand, when the determining unit 232 determines in step S85 that the queue length Q is greater than the predetermined value, no more packet can be stored in the buffer 176, and therefore the determining unit 232 generates a signal indicating that enqueueing is not possible. Then, the determining unit 232 supplies the generated signal indicating that enqueueing is not possible to the input control unit 231. The process proceeds to step S92.

When the signal indicating that enqueueing is impossible is supplied from the determining unit 232, the input control unit 231 in step S92 generates a signal indicating that the packet is not enqueued, and supplies the generated signal indicating that the packet is not enqueued to the network layer 172. The input control unit 231 generates a signal to generate an output request signal, and supplies the generated signal to generate an output request signal to the request signal generating unit 234.

When the signal to generate an output request signal is supplied from the input control unit 231, the request signal generating unit 234 in step S93 generates an output request signal requesting the dequeueing of a packet. The request signal generating unit 234 supplies the generated output request signal to the output processing unit 214. Then a return to step S84 is made to repeat the above-described process.

Thus, the virtual device driver 174 determines whether a packet can be enqueued by determining whether the queue length is greater than the predetermined value. Then, when the virtual device driver 174 determines that the packet can be enqueued, the virtual device driver 174 obtains the packet, and enqueues the obtained packet in the buffer 176. When the virtual device driver 174 determines that the packet cannot be enqueued, the virtual device driver 174 does not obtain the packet.

When the virtual device driver 174 thus determines that the packet cannot be enqueued, the virtual device driver 174 supplies a signal indicating that the packet cannot be enqueued to the network layer 172. Since the packet is neither enqueued nor discarded, it appears to the network layer 172 that a problem of exclusive control of the queue has occurred. That is, the network layer 172 determines that the queue in which packets are stored (an area where packets are stored in the buffer 176) cannot be accessed because a packet output process (dequeueing of a packet) is performed in response to a hardware interrupt or the like.

In this case, since the signal indicating that the packet cannot be enqueued is supplied from the virtual device driver 174 to the network layer 172, the network layer 172 generates an input request signal requesting the enqueueing of the packet not enqueued, and supplies the input request signal to the virtual device driver 174. In other words, the network layer 172 reattempts to enqueue the packet. The input request signal is therefore supplied repeatedly to the virtual device driver 174. As a result, an output request signal is repeatedly supplied from the input processing unit 211 to the output processing unit 214. Thereby, the number of times (opportunities) that the packet output process is performed is increased, and thus packet transmission intervals can be controlled to be shorter (smaller granularity).

Incidentally, the process of reattempting to enqueue the packet increases a load on the OS. However, since the process of reattempting to enqueue the packet has lower priority than other processes, the other processes performed in the system are hardly affected by the process of reattempting to enqueue the packet. Thus, a special process for adjusting a load of the process of reattempting to enqueue the packet is not particularly required.

Figure 10:
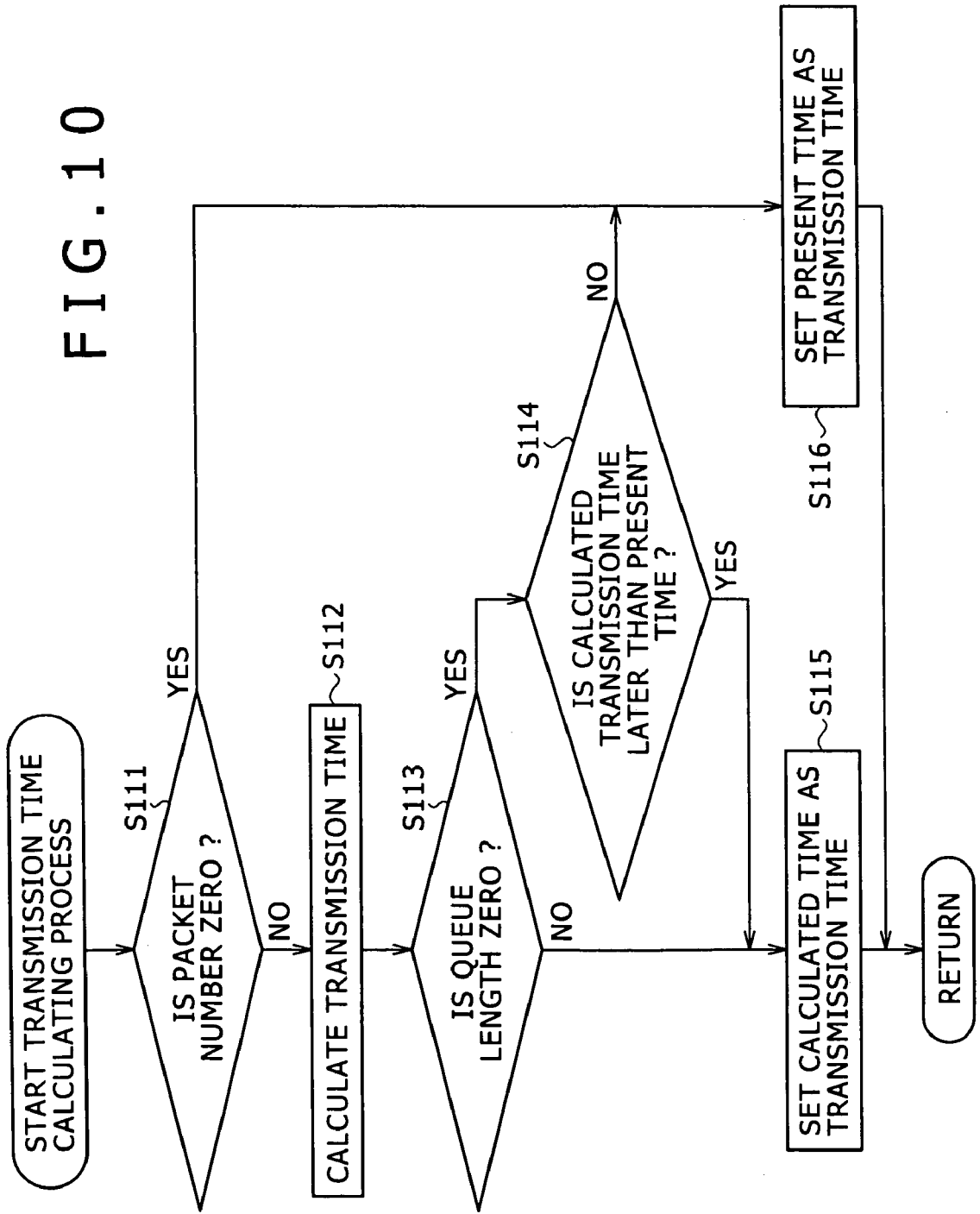
FIG. 10 is a flowchart of assistance in explaining a transmission time calculating process.

The transmission time calculating process corresponding to the process of step S87 in FIG. 9 will be described with reference to a flowchart of FIG. 10.

In step S111, the calculating unit 233 determines on the basis of the packet information supplied from the input control unit 231 whether the packet number i of the packet obtained by the input control unit 231 from the network layer 172 is "0."

When the calculating unit 233 determines in step S111 that the packet number i of the packet obtained from the network layer 172 is not "0," the process proceeds to step S112, where the calculating unit 233 calculates the transmission time of the packet obtained from the network layer 172. For example, in step S112, the calculating unit 233 calculates the transmission time of the packet by calculating Equation (4).

$$(Ti) = (T(i-1)) + (L(i-1))/r \qquad (4)$$

where Ti is the transmission time of the packet having the packet number i; T(i−1) is the transmission time of a packet having a packet number "i−1," the transmission time being retained in the output information retaining unit 213; L(i−1) is the size (amount of data) of the packet having the packet number "i−1," the size being retained in the output information retaining unit 213; and r is the predetermined shaping rate retained in the output information retaining unit 213.

In step S113, the calculating unit 233 determines whether the queue length Q retained in the queue information retaining unit 212 is "0." When the calculating unit 233 determines in step S113 that the queue length Q is not "0," the process proceeds to step S115.

On the other hand, when the calculating unit 233 determines in step S113 that the queue length Q is "0," the process proceeds to step S114, where the calculating unit 233 determines whether the calculated transmission time Ti is later than the present time supplied from the time retaining unit 215.

For example, in step S114, the calculating unit 233 determines whether the calculated transmission time Ti is later than the present time supplied from the time retaining unit 215 by determining whether the calculated transmission time Ti and the present time T supplied from the time retaining unit 215 satisfy Equation (5).

$$T < Ti \qquad (5)$$

Thus, in this case, when the calculating unit 233 determines that the calculated transmission time Ti and the present time T supplied from the time retaining unit 215 satisfy Equation (5), the calculating unit 233 determines that the calculated transmission time Ti is later than the present time supplied from the time retaining unit 215.

When the calculating unit 233 determines in step S114 that the calculated transmission time Ti is later than the present time supplied from the time retaining unit 215, the process proceeds to step S115, where the calculating unit 233 sets the calculated transmission time Ti as the transmission time of the packet having the packet number "i." The calculating unit 233 supplies the set transmission time Ti and the packet information to the output information retaining unit 213. The output information retaining unit 213 retains the transmission time Ti and the packet information supplied from the calculating unit 233. Then, the calculating unit 233 generates a signal indicating that the transmission time is set. The calculating unit 233 supplies the generated signal indicating that the transmission time is set to the input control unit 231, whereby the process is ended.

When the calculating unit 233 determines in step S114 that the calculated transmission time Ti is not later than the present time, the calculated transmission time Ti has already passed, and hence the process proceeds to step S116.

Also, when the calculating unit 233 determines in step S111 that the packet number i of the packet supplied from the network layer 172 is "0," the process proceeds to step S116, where the calculating unit 233 sets the present time T as the transmission time Ti of the packet having the packet number "i." The calculating unit 233 supplies the set transmission time Ti and the packet information to the output information retaining unit 213. The output information retaining unit 213 retains the transmission time Ti and the packet information supplied from the calculating unit 233. Then, the calculating unit 233 generates a signal indicating that the transmission time is set. The calculating unit 233 supplies the generated signal indicating that the transmission time is set to the input control unit 231, whereby the process is ended.

Thus, the calculating unit 233 calculates the transmission time of the packet, and sets the calculated transmission time or the present time as the transmission time of the packet. It is to be noted that while a method of adjusting packet transmission intervals on the basis of a scheduling algorithm referred to as a Leaky Bucket algorithm has been described above with reference to the flowchart of FIG. 10, it is of course possible to adjust packet transmission intervals on the basis of not only the Leaky Bucket algorithm but also other scheduling algorithms.

Figure 11:
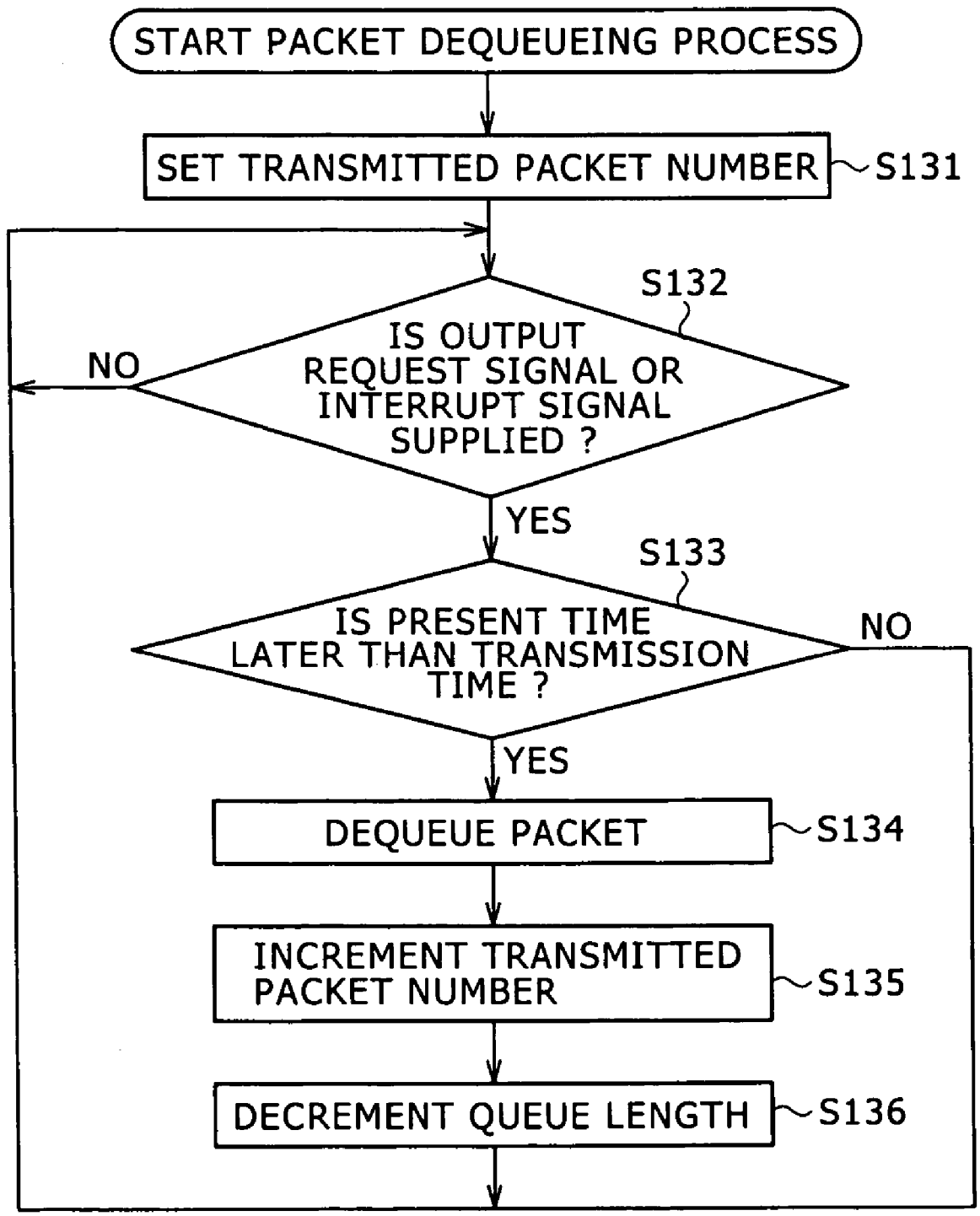
FIG. 11 is a flowchart of assistance in explaining a packet dequeueing process.

A process of dequeueing a packet by the virtual device driver 174 will be described with reference to a flowchart of FIG. 11.

Each time an interrupt signal to obtain a packet is supplied from the kernel timer 175 to the virtual device driver 174, or each time an output request signal is supplied from the input processing unit 211, the virtual device driver 174 calls a predetermined function such for example as an interrupt handler function, and performs the process of dequeueing a packet (output process).

In step S131, the virtual device driver 174 sets a transmitted packet number. For example, in step S131, since no packet is transmitted yet, the virtual device driver 174 sets "0" as the transmitted packet number retained by the output information retaining unit 213.

In step S132, the signal processing unit 235 determines whether an interrupt signal or an output request signal is supplied. Specifically, the signal processing unit 235 determines whether an interrupt signal is supplied from the kernel timer 175 or whether an output request signal is supplied from the input processing unit 211. When the signal processing unit 235 determines in step S132 that an interrupt signal or an output request signal is not supplied, no packet is dequeued, and thus the determination process is repeated until the signal processing unit 235 determines that an interrupt signal or an output request signal is supplied.

When the signal processing unit 235 determines in step S132 that an interrupt signal or an output request signal is supplied, a packet is dequeued, and thus the signal processing unit 235 generates a signal to dequeue the packet and supplies the generated signal to dequeue the packet to the output control unit 236. The process proceeds to step S133.

Since the frequency of occurrence of timer events of the kernel timer 175 is normally 100 Hz, an interrupt signal is supplied to the signal processing unit 235 at least every 10 msec, for example. In addition, an output request signal is supplied from the input processing unit 211 each time the input processing unit 211 obtains an input request signal from the network layer 172. Hence, for example, an output request signal is supplied from the input processing unit 211 to the signal processing unit 235 every 15 μsec or so. At this time, each time the input processing unit 211 obtains an input request signal from the network layer 172, that is, each time the process of enqueueing a packet or the like is requested by the network layer 172, the signal processing unit 235 in the output processing unit 214 controls the performance of the process of dequeueing a packet which process is different from the process requested by the network layer 172.

When the signal to dequeue the packet is supplied from the signal processing unit 235, the output control unit 236 in step S133 determines whether the present time is later than the transmission time of a packet having a same packet number as the transmitted packet number. For example, in step S133, the output control unit 236 determines whether the present time is later than the transmission time by calculating Equation (6) on the basis of the transmitted packet number and the packet transmission time retained in the output information retaining unit 213 and the present time supplied from the time retaining unit 215.

$$Ti < T \qquad (6)$$

where Ti is the transmission time of a packet having a packet number "i," the transmission time being retained in the output information retaining unit 213; and T is the present time supplied from the time retaining unit 215. Hence, for example, when the transmitted packet number is "i" and the transmission time Ti and the present time T satisfy Equation (6), the output control unit 236 determines that the present time is later than the transmission time of the packet having the same packet number as the transmitted packet number.

When the output control unit 236 determines in step S133 that the present time is later than the transmission time, the packet is transmitted. The process therefore proceeds to step S134, where the output control unit 236 dequeues the packet whose transmission time has arrived. Specifically, in step S134, the output control unit 236 obtains the packet whose transmission time has arrived from the buffer 176, and supplies the obtained packet to the device driver 177.

In step S135, the output information retaining unit 213 increments the transmitted packet number retained in the output information retaining unit 213 under control of the output control unit 236. For example, when the transmitted packet number retained in the output information retaining unit 213 is "1," the output information retaining unit 213 in step S135 increments the transmitted packet number so as to make the transmitted packet number become "2" under control of the output control unit 236.

In step S136, the queue information retaining unit 212 decrements the queue length Q retained in the queue information retaining unit 212 under control of the output control unit 236. The process then returns to step S132. For example, when the queue length Q retained in the queue information retaining unit 212 is "3," the queue information retaining unit 212 in step S136 decrements the queue length Q so as to make the queue length Q become "2" under control of the output control unit 236.

When the output control unit 236 determines in step S133 that the present time is not later than the transmission time, on the other hand, the packet is not transmitted. A return is therefore made to step S132 to repeat the above-described process.

Thus, the virtual device driver 174 performs the packet output process each time an interrupt signal or an output request signal is supplied.

Thus, the output control unit performs the packet output process each time an interrupt signal or an output request signal is supplied, whereby packet transmission can be controlled with a smaller load by software control.

In addition, the output control unit performs the packet output process each time an interrupt signal or an output request signal is supplied, whereby packet transmission can be controlled at shorter time intervals, and consequently occurrence of burst traffic in a communication network can be reduced. Thereby, the number of packets discarded at a router or the like on a communication path can be reduced.

In addition, the output control unit performs the packet output process each time an interrupt signal or an output request signal is supplied, whereby packet transmission can be controlled at shorter time intervals. Consequently jitter is reduced, and the size of a buffer in a terminal device on a receiving side which buffer is required to adjust delay fluctuations due to jitter can be reduced.

Therefore the size of data buffered in the terminal device on the receiving side can be reduced. In addition, the queue length of packets in a communication device on a transmitting side can be kept short. It is therefore possible to reduce a delay due to buffering, and thereby realize a low-delay real-time application program.

Further, each time a process is requested by the network layer, another process is performed, so that the process can be controlled at shorter time intervals by software control.

As described above, the packet output process is performed each time an input request signal is supplied from the network layer, whereby packet transmission can be controlled with a smaller load by software control. In addition, the packet output process is performed each time an input request signal is supplied from the network layer, or each time an interrupt signal is supplied from the kernel timer, whereby packet transmission can be controlled at shorter time intervals.

Further, each time a process is requested by the network layer, another process is performed, so that the process can be controlled at shorter time intervals by software control.

According to the present invention, packets are stored, and thus the packets can be transmitted. According to the present invention, the packet output process is performed each time an input request signal is supplied from the network layer, whereby packet transmission can be controlled with a smaller load by software control.

Further, according to the present invention, the packet output process is performed each time an input request signal is supplied from the network layer, or each time an interrupt signal is supplied from the kernel timer, whereby packet transmission can be controlled at shorter time intervals.

Further, according to the present invention, each time a process is requested by the network layer, another process is performed, so that the process can be controlled at shorter time intervals by software control.

It is to be noted that the present invention is applicable not only to communication apparatuses that control packet transmission intervals but also to control devices that control time intervals at which a predetermined process -is performed. In this case, each time the performance of a process is requested by a network layer or each time an interrupt signal is supplied from a kernel timer, a control device performs another process.

The series of processes described above can be carried out not only by hardware but also by software. When the series of processes is to be carried out by software, a program constituting the software is installed from a recording medium onto a computer incorporated in special hardware, or a general-purpose personal computer, for example, that can perform various functions by installing various programs thereon.

As shown in FIG. 6, the recording medium is not only formed by a packaged medium distributed to users to provide the program separately from the computer and having the program recorded thereon, the packaged medium including the magnetic disk 131 (including flexible disks), the optical disk 132 (including CD-ROM (Compact Disk-Read Only Memory) and DVD (Digital Versatile Disk), the magneto-optical disk 133 (including MD (MiniDisk) (trademark)), the semiconductor memory 134 or the like, but also formed by the ROM 102, a hard disk included in the recording unit 108, or the like having the program recorded therein and provided to the user in a state of being preincorporated in the computer.

Incidentally, the program for performing the series of processes may be installed on a computer via an interface such as a router, a modem or the like and via a wire or wireless communication medium such as a local area network, the Internet, digital satellite broadcasting or the like.

Further, in the present specification, the steps describing the program stored on the recording medium include not only processes carried out in time series in the described order but also processes carried out in parallel or individually and not necessarily in time series.

It is to be noted that in the present specification, a system refers to an apparatus as a whole formed by a plurality of devices.

It should be understood by those skilled in the art that various modifications, combinations, sub-combinations and alterations may occur depending on design requirements and other factors insofar as they are within the scope of the appended claims or the equivalents thereof.

The invention claimed is:

1. A transmission device for transmitting data via a communication network, comprising:
   a buffer that stores packets disposed in a queue for transmission;
   requesting means for requesting transmission of a selected packet to a destination device a route on the communication network to which is determined when an instruction to transmit the selected packet is supplied from an application program or when the selected packet is not stored in said buffer, while a number of packets stored in said buffer is smaller than a first threshold value;

determining means implemented by executing a first program, for determining whether the number of packets stored in said buffer is equal to or smaller than a second threshold value smaller than said first threshold value when the transmission of the selected packet is requested by said requesting means;

storing control means implemented by executing a second program, for controlling storing of the selected packet in said buffer so as to store the selected packet in said buffer when said determining means determines that the number of packets stored in said buffer is equal to or smaller than said second threshold value, and so as not to store the selected packet in said buffer when said determining means determines that the number of packets stored in said buffer exceeds said second threshold value; and output control means implemented by executing a third program, for controlling output of the selected packet stored in said buffer to a control program for controlling transmission of the selected packet by physical layer hardware based on said queue when the transmission of the selected packet is requested by said requesting means.

2. The transmission device as claimed in claim 1, wherein when the transmission of the selected packet is requested by said requesting means, said output control means obtains the selected packet whose transmission time has arrived from said buffer, and controls output of the obtained packet to said control program for controlling the transmission of the obtained packet by the physical layer hardware.

3. The transmission device as claimed in claim 1, wherein when an interrupt process is requested at predetermined time intervals, said output control means obtains the selected packet whose transmission time has arrived from said buffer, and controls output of the obtained packet to said control program for controlling transmission of the obtained packet by the physical layer hardware.

4. A transmission method for transmitting data via a communication network, said transmission method comprising:

requesting transmission of a selected packet to a destination device a route on the communication network to which is determined when an instruction to transmit the selected packet is supplied from an application program or when the selected packet is not stored in a buffer that stores packets disposed in a queue for transmission, while a number of packets stored in the buffer is smaller than a first threshold value;

determining whether the number of packets stored in the buffer is equal to or smaller than a second threshold value smaller than the first threshold value when the transmission of the selected packet is requested;

controlling storing of the selected packet in the buffer so as to store the selected packet in said buffer when it is determined that the number of packets stored in the buffer is equal to or smaller than the second threshold value, and so as not to store the selected packet in the buffer when it is determined that the number of packets stored in the buffer exceeds the second threshold value; and controlling output of the selected packet stored in the buffer to a control program for controlling the transmission of the selected packet by the physical layer hardware based on the queue when the transmission of the selected packet is requested.

5. A recording medium recorded with a computer readable program for executing a method for transmitting data via a communication network, said transmission method comprising:

requesting transmission of a selected packet to a destination device a route on the communication network to which is determined when an instruction to transmit the selected packet is supplied from an application program or when the selected packet is not stored in a buffer that stores packets disposed in a queue for transmission, while a number of packets stored in the buffer is smaller than a first threshold value;

determining whether the number of packets stored in the buffer is equal to or smaller than a second threshold value smaller than the first threshold value when the transmission of the selected packet is requested;

controlling storing of the selected packet in the buffer so as to store the selected packet in said buffer when it is determined that the number of packets stored in the buffer is equal to or smaller than the second threshold value, and so as not to store the selected packet in the buffer when it is determined that the number of packets stored in the buffer exceeds the second threshold value; and controlling output of the selected packet stored in the buffer to a control program for controlling the transmission of the selected packet by physical layer hardware based on the queue when the transmission of the selected packet is requested.

6. A system for transmitting data via a communication network, said system comprising:

a processor operable to execute instructions; and instructions for executing a transmission method, the transmission method including:

requesting transmission of a selected packet to a destination device a route on the communication network to which is determined when an instruction to transmit the selected packet is supplied from an application program or when the selected packet is not stored in a buffer that stores packets disposed in a queue for transmission, while a number of packets stored in the buffer is smaller than a first threshold value;

determining whether the number of packets stored in the buffer is equal to or smaller than a second threshold value smaller than the first threshold value when the transmission of the selected packet is requested;

controlling storing of the selected packet in the buffer so as to store the selected packet in the buffer when it is determined that the number of packets stored in the buffer is equal to or smaller than the second threshold value, and so as not to store the selected packet in the buffer when it is determined that the number of packets stored in the buffer exceeds the second threshold value; and controlling output of the selected packet stored in the buffer to a control program for controlling the transmission of the selected packet by physical layer hardware based on the queue when the transmission of the selected packet is requested.

7. A control device, comprising:

requesting means for requesting a process to be performed, and for repeatedly requesting the same process to be performed when the requested process is not performed, wherein the requested process is for storing a selected packet in a buffer for storing packets disposed in a queue for transmission, and wherein the requested process is not performed when the number of packets stored in said buffer exceeds a second threshold value smaller than a first threshold value;

first performance control means for controlling the performance of the requested process so as to make said requesting means continue requesting the requested process to be performed; and second performance control means for controlling the performance of another process when said requesting means requests the process to be performed.

8. A transmission device for transmitting data via a communication network, comprising:

a buffer operable to store packets disposed in a queue for transmission;

a requesting unit operable to request transmission of a selected packet to a destination device a route on the communication network to which is determined when an instruction to transmit the selected packet is supplied from an application program or when the selected packet is not stored in said buffer, while a number of packets stored in said buffer is smaller than a first threshold value;

a determining unit implemented by executing a first program and operable to determine whether the number of packets stored in said buffer is equal to or smaller than a second threshold value smaller than said first threshold value when the transmission of the selected packet is requested by said requesting unit;

a storing controller implemented by executing a second program and operable to control storing of the selected packet in said buffer so as to store the selected packet in said buffer when said determining unit determines that the number of packets stored in said buffer is equal to or smaller than said second threshold value, and so as not to store the selected packet in said buffer when said determining unit determines that the number of packets stored in said buffer exceeds said second threshold value; and an output controller implemented by executing a third program and operable to control output of the selected packet stored in said buffer to a control program for controlling transmission of the selected packet by physical layer hardware based on said queue when the transmission of the selected packet is requested by said requesting unit.

9. A control device, comprising:

a requesting unit operable to request a process to be performed, and to repeatedly request the same process to be performed when the requested process is not performed, wherein the requested process is for storing a selected packet in a buffer for storing packets disposed in a queue for transmission, and wherein the requested process is not performed when the number of packets stored in said buffer exceeds a second threshold value smaller than a first threshold value;

a first performance controller operable to control the performance of the requested process so as to make said requesting unit continue requesting the requested process to be performed; and a second performance controller operable to control the performance of another process when said requesting unit requests the process to be performed.

* * * * *